United States Patent
Arledge, Jr. et al.

(10) Patent No.: US 6,535,294 B1
(45) Date of Patent: Mar. 18, 2003

(54) SYSTEM AND METHOD FOR PREPARING CUSTOMIZED PRINTED PRODUCTS OVER A COMMUNICATIONS NETWORK

(75) Inventors: Sol E. Arledge, Jr., Floyd Knobs, IN (US); Bernard D. Pasquantino, New Albany, IN (US); G. Steve Wakefield, Huntsville, AL (US)

(73) Assignee: Discount Labels, Inc., New Albany, IN (US)

( * ) Notice: Subject to any disclaimer, the term of this patent is extended or adjusted under 35 U.S.C. 154(b) by 0 days.

(21) Appl. No.: 09/103,205

(22) Filed: Jun. 23, 1998

(51) Int. Cl.[7] .................. B41B 19/00; B41F 19/00; G06F 15/00; G06K 1/00
(52) U.S. Cl. ................. 358/1.15; 358/1.14; 705/26; 705/27
(58) Field of Search ................. 358/1.14, 1.15; 705/26, 27

(56) References Cited

U.S. PATENT DOCUMENTS

| | | | |
|---|---|---|---|
| 5,555,496 A | * 9/1996 | Tackbary et al. | .......... 358/1.15 |
| 5,638,504 A | 6/1997 | Scott et al. | |
| 5,664,115 A | 9/1997 | Fraser | |
| 5,671,279 A | 9/1997 | Elgamal | |
| 5,692,132 A | 11/1997 | Hogan | |
| 5,699,526 A | 12/1997 | Siefert | |
| 5,699,528 A | 12/1997 | Hogan | |
| 5,710,883 A | 1/1998 | Hong et al. | |
| 5,710,887 A | * 1/1998 | Chelliah et al. | ............ 345/835 |
| 5,727,156 A | 3/1998 | Herr-Hoyman et al. | |
| 5,739,512 A | 4/1998 | Tognazzini | |
| 5,748,484 A | 5/1998 | Cannon et al. | |
| 5,749,075 A | 5/1998 | Toader et al. | |
| 5,757,917 A | 5/1998 | Rose et al. | |
| 5,826,244 A | * 10/1998 | Huberman | .................... 705/26 |
| 6,016,504 A | * 1/2000 | Arnold et al. | ............. 358/1.15 |
| 6,076,076 A | * 6/2000 | Gottfreid | ...................... 705/26 |
| 6,076,080 A | * 6/2000 | Morscheck et al. | ......... 705/400 |
| 6,128,600 A | * 10/2000 | Imamura et al. | ........... 358/1.15 |
| 6,167,382 A | * 12/2000 | Sparks et al. | .................. 705/14 |

OTHER PUBLICATIONS http://www.digital-net.com/vpp.

* cited by examiner

*Primary Examiner*—Edward Coles
*Assistant Examiner*—Ashanti Ghee

(57) ABSTRACT

A system for preparing customized printed products over a communications network, providing a wholesaler web server computer connected to the network; a printed products preparation system therein allowing an end-user anonymously connected to the wholesaler web server computer through at least one retailer web server to prepare an electronic file defining customized printed product; a workflow management server adapted to receive a copy of the electronic file to print the predetermined quantity of the customized printed product; the wholesaler web server computer being adapted to transmit a notification message to the at least one retailer web server computer; the copy of the electronic file being transmitted from the printed products preparation system to the workflow management system upon designation of the notification message by an operator of the retailer web server computer.

20 Claims, 29 Drawing Sheets

145e

| | |
|---|---|
| From: | wholesaler@wholesalerwebserver.net |
| To: | retailer@retailerwebserver.net |
| Date: | June 23, 1998 9:00 am EST |
| Re: | A new order has been submitted to your queue New Order Reference No. 123-456-1000 |

An electronic order has been completed by one of your customers through the customized printed products system. Please follow these three easy steps to complete the ordering process:

1. Visit our web site at http://www.wholesalerwebsite.net;

2. Log on to your Dealer Account by entering your Account ID, User ID and Password in the designated fields.

3. Once you have accessed your Dealer Account, please view the New Order Queue and process the billing information.

4. After you have made satisfactory payment arrangements, including billing your customer's credit card, please select the "Submit Order" button. The order will automatically enter out production line, where the customer's order will be printed and shipped pursuant to the customer's request.

Thank you.

FIG. 22

SYSTEM AND METHOD FOR PREPARING CUSTOMIZED PRINTED PRODUCTS OVER A COMMUNICATIONS NETWORK

BACKGROUND OF THE INVENTION

1. Technical Field of the Invention

The present invention relates to systems and methods for preparing customized printed products, such as pressure-sensitive labels, business cards, business and personal stationary, personal greeting cards, and the like, wherein preselected, user-defined indicia may be provided on the printed products. More particularly, the present invention relates to a system and method for preparing a customized printed product, wherein the printed product is prepared by an end-user thereof over a quasi-public communications network, such as the Internet.

2. Description of the Related Art

Printed products, such as pressure-sensitive labels, business cards, business and personal stationary, personal greeting cards, and the like, are widely used by businesses and individuals alike to uniquely identify that business or individual and to convey certain information thereby. For example, a sales representative oftentimes carries a plurality of business cards having information such as the representative's name, business address, telephone number, e-mail address, and the name of the representative's business organization, preprinted thereon. In addition to information of the type listed above, the business card may likewise contain certain images or graphics, such as a company logo or other original artwork, preprinted thereon to uniquely identify the business or individual and to give the business card a visually-pleasing appearance.

Similarly, many businesses and individuals alike oftentimes include certain information, such as a business address, business telephone number, Internet web site "home page", and the like, as well as certain images or graphics, such as a company logo or other original artwork, preprinted on letter-quality paper which uniquely identifies the business or individual and gives any written communication made thereby a visually-pleasing appearance.

The number and variety of printed products typical of those used by many businesses for similar purposes is nearly endless. For example, promotional materials, such as advertising postcards, coupons, pressure-sensitive labels, and the like, are used by many businesses. Such promotional materials typically include various indicia preprinted thereon which are unique to that business. In most such cases, preparing and ordering the printed products is oftentimes a time-consuming process. For example, to obtain a desired quantity of customized, pre-printed products, an end-user business typically prepares a layout design of the desired printed product design (which may include original artwork, such as a company logo or the like), contacts a print shop, submits the design layout and all the necessary artwork for the print shop to prepare a draft printed product, receives the draft printed product from the print shop, revises the draft printed product and resubmits the revised draft to the print shop for final printing. The end-user must then wait for the print shop to prepare the necessary equipment, print the desired quantity of the printed product and ship the finished product to the end-user. During this process, the end-user and the print shop typically communicate with one another by telephone, facsimile or mail, oftentimes resulting in significant delays in the end-user's obtaining the finished product.

It is desirable, then, to provide a system and method for preparing customized printed products. Even further, it is desirable to provide a system and method for preparing customized printed products, wherein an end-user thereof uses a quasi-public communication network, such as the Internet, to communicate directly with a print shop, thereby providing an expedited method for preparing the customized printed products.

For example, the on-line desktop publishing service sold by Digital-Net, Inc., of Saint Paul, Minn., under the claimed trademark VIRTUAL PRE-PRESS permits an end-user thereof to connect via the Internet to the Digital-Net VIRTUAL PRE-PRESS order processing system through a hypertext link from a subscribing third-party print shop web site, prepare a customized printed product, such as a business card, using the VIRTUAL PRE-PRESS system, and submit a formatted, digital file copy of the customized printed product attached to an e-mail sent from the VIRTUAL PRE-PRESS system to the third party print shop over the Internet. The third party print shop receives the e-mail (and file attached thereto containing the digital copy of the customized printed product), prints the indicated quantity of the finished products according to the end-user's design and ships the finished products directly to the end-user.

The end-user is connected to the Digital-Net web server computer (having the domain name www.digital-net.com) during preparation of the customized printed product; once completed, the digital file copy of the customized printed product is attached as a file to an e-mail which is sent from the Digital-Net system to the print shop web site, where the print shop processes the digital file to prepare and print the order. After the end-user is transferred from the print shop web site to the Digital-Net web server computer, it is unnecessary for the end-user to reconnect to the print shop web site. Further, the Digital-Net system does not print the finished product, but merely interjects itself between the end-user and the print shop to provide customized layout design features which assist the end-user in instructing the print shop how to lay out and print the finished printed product. As such, users may only connect to the Digital-Net system via web sites of print shops which have access to printing equipment. A print shop which does not have access to bulk printing equipment, such as, for example, a commercial photocopy kiosk, cannot offer the VIRTUAL PRE-PRESS system to its retail customers, as the VIRTUAL PRE-PRESS system will not permit an end-user retail customer to order printed products therefrom. Thus, it is desirable to provide a system and method for preparing a desired quantity of customized printed products, wherein an end-user thereof connects to, communicates with and submits an order to an anonymous wholesaler print shop, directly, thereby permitting the end-user to order printed products from a retail print shop which does not have access to bulk printing equipment, such as a commercial photocopy kiosk. It is even further desirable to provide a system and method for preparing a desired quantity of customized printed products, wherein an end-user thereof connects to, communicates with and submits an order to an anonymous wholesaler print shop, directly, via a subscribing retailer web site.

It is also desirable to provide a system and method for preparing customized printed products, wherein an end-user thereof uses a product design, layout and preparation system over a quasi-public communications network, such as the Internet, to prepare, in realtime, the customized printed products thereby.

It is also desirable to provide a system and method for preparing customized printed products, wherein an end-user thereof is capable of quickly recreating customized printed products which were previously designed and purchased by the end-user. It is therefore desirable to provide a system and method for preparing customized printed products, wherein the system includes at least one database for storing end-user data therein.

SUMMARY OF THE INVENTION

The present invention is for a system and method for preparing customized printed products, such as pressure-sensitive labels, business cards, business and personal stationary, personal greeting cards, and the like, wherein the printed products may include preselected, user-defined indicia thereon, and wherein the printed product is prepared by an end-user thereof over a quasi-public communications network, such as the Internet.

An end-user connects to the Internet, and particularly, to the World Wide Web thereof, using conventional browser software installed locally on the end-user's computer, and using the conventional hypertext transfer protocol ("http"). Using the browser and conventional Internet addressing, the end-user connects to a subscribing commercial printed products retailer web server computer hosting a retailer web site on the World Wide Web, whereat the end-user is presented with a button to initiate preparation and ordering of customized printed products according to the various embodiments of the present invention. Upon selecting the button, the end-user's browser is transferred from the retailer web site to an anonymous printed products wholesaler web server computer hosting a wholesaler web site on the World Wide Web. The anonymous transfer of the end-user's computer from the retailer's web server computer to the wholesaler's web server computer presents the end-user with the appearance of being connected to the retailer web site at all times throughout the preparation and ordering of the customized printed products. Thus, it never appears to the end-user that the end-user's browser has transferred from the retailer web site to the wholesaler web site.

Once connected to the wholesaler web server computer, the end-user logs in to a printed products preparation system located, operated and managed on and by the wholesaler web server computer. The preparation system includes all the necessary programs, routines, applications, applets, databases, support files and libraries necessary to function as herein described. The end-user may register a new end-user account (for example, when the end-user uses the preparation system a first time) or may access an existing end-user account (for example, when the end-user has used the preparation system previously and wishes to re-order a design previously prepared and ordered). In either case, the preparation system requests a unique user-name and password from the end-user, thereby providing secure access to the preparation system by the end-user.

After the end-user has logged in to the preparation system, the end-user is guided through a design and layout process comprising a series of conventional, interconnected screens, windows, menus, fields, text-entry boxes, and the like, which cooperate with one another to enable the end-user to define the type, design, style and layout of the customized printed product. The preparation system preferably guides the end-user through this design and layout process using hypertext markup language ("html") in cooperation with a "realtime" programming language, such as the cross-platform programming language licensed by Sun Microsystems of Palo Alto, Calif., under the trademark JAVA. The end-user may select from a preselected library of text fonts and graphic images, and may upload original artwork files from the end-user's computer to the wholesaler web server computer for the end-user's use with the preparation system. The preparation system also prompts the end-user to indicate the destination to which the finished products should be shipped and the manner in which the end-user wishes to be billed for the cost of using the preparation system, which may include all associated printing costs.

Upon entering all desired design, layout, shipping and billing information, the end-user submits the order to the wholesaler, at which point the preparation system automatically dockets a new order on a new order queue of the retailer's dealer account. The dealer account on which the new order is docketed corresponds to the retailer from whose web site the end-user accessed the wholesaler web server computers (and the preparation system thereby). The preparation system also sends an e-mail to the subscribing retailer web server computer, instructing the retailer to log in to the retailer's dealer account to review the order information for all pending end-user orders. The retailer connects to the wholesaler's web site (using conventional Internet browser software and communication means) and logs in to the retailer's dealer account, where the retailer may review the order information (including viewing an image of the customized printed product submitted for printing by the end-user), process the billing instructions, accept the order, hold the order or cancel the order. Once the retailer accepts the order, the file containing the design and layout information is transferred internally from the wholesaler web server computer to a workflow management server computer system located in the wholesaler's print processing plant. The order is then processed and printed by the wholesaler's printing equipment, as managed by the workflow management server computer system.

The present invention enables an end-user to communicate directly with an anonymous wholesaler in preparing and ordering a customized printed product, thereby eliminating involvement of the retailer from the preparation of the customized printed products, while presenting an appearance to the end-user that it is the retailer, and not the wholesaler, with whom the end-user is communicating.

It is an object of the present invention to provide a system and method for preparing customized printed products. Even further, it is an object of the present invention to provide a system and method for preparing customized printed products, wherein an end-user thereof uses a quasi-public communication network, such as the Internet, to communicate directly with a print shop, thereby providing an expedited method for preparing the customized printed products.

It is another object of the present invention to provide a system and method for preparing a desired quantity of customized printed products, wherein an end-user thereof connects to, communicates with and submits an order to an anonymous wholesaler print shop, directly, thereby permitting the end-user to order printed products from a retail print shop which does not have access to bulk printing equipment, such as a commercial photocopy kiosk. It is an even further object of the present invention to provide a system and method for preparing a desired quantity of customized printed products, wherein an end-user thereof connects to, communicates with and submits an order to an anonymous wholesaler print shop, directly, via a subscribing retailer web site.

It is yet another object of the present invention to provide a system and method for preparing customized printed products, wherein an end-user thereof uses a product design, layout and preparation system over a quasi-public communications network, such as the Internet, to prepare, in realtime, the customized printed products thereby.

It is still another object of the present invention to provide a system and method for preparing customized printed products, wherein an end-user thereof is capable of quickly recreating customized printed products which were previously designed and purchased by the end-user. It is therefore desirable to provide a system and method for preparing customized printed products, wherein the system includes at least one database for storing end-user data therein.

These and other objects, features and advantages of the present invention will become apparent to those skilled in the art upon reading the ensuing detailed description in conjunction with the following drawings and with reference to the appended claims.

A system for preparing customized printed products over a communications network according to a preferred embodiment of the present invention comprises a wholesaler web server computer connected to the network, the wholesaler web server computer having a printed products preparation system provided thereby, the printed products preparation system being adapted to permit an end-user operating an end-user client computer connected to the wholesaler web server computer to prepare an electronic file defining a customized printed product; at least one retailer web server computer connected to the network, the at least one retailer web server computer being adapted to anonymously transfer the end-user client computer connected thereto to the wholesaler web server computer over the network; a wholesaler workflow management server computer connected to the wholesaler web server computer, the wholesaler workflow management server having a workflow management system provided thereby, the workflow management system being adapted to receive a copy of the electronic file from the printed products preparation system and to print a predetermined quantity of the customized printed product therefrom; the wholesaler web server computer being adapted to transmit, responsive to the printed products preparation system, a notification message to the at least one retailer web server computer, the at least one retailer web server computer being adapted to receive the notification message, the at least one retailer web server computer being adapted to connect to the wholesaler web server computer to view the copy of the electronic file; and, the copy of the electronic file being transmitted from the printed products preparation system to the workflow management system upon designation of the notification message by an operator of the retailer web server computer.

A method for preparing customized printed products over a quasi-public communications network, such as the Internet, using the system according to a preferred embodiment of the present invention is also provided hereby and includes the steps of providing a client computer, a retailer web server computer and a wholesaler web server computer, the retailer web server being connected to the wholesaler computer over the communications network; connecting the client computer to the retailer web server computer; the retailer web server computer connecting the client computer to the wholesaler web server computer upon an end-user of the client computer selecting a predetermined link provided on the retailer web server computer; an end-user using a preparation system provided anonymously on the wholesaler web server computer to prepare a new order file having an electronic image therein, the image representing a desired customized printed product; the wholesaler web server computer transmitting a notification message to the retailer web server computer upon the end-user completing the new order file; the retailer making a designation of the new order file upon receiving the notification message, the designation including to submit, to hold or to cancel the new order file; and, the wholesaler printing a predetermined quantity of printed products according to the new order file upon receiving the designation of submit from the retailer.

BRIEF DESCRIPTION OF THE DRAWINGS

A better understanding of the present invention will be had upon reference to the following description in conjunction with the accompanying drawings in which like numerals refer to like parts, and wherein:

FIG. 22 is a display showing a notification e-mail sent by the system of FIG. 1;

DETAILED DESCRIPTION OF THE PREFERRED EMBODIMENTS

Figure 1:
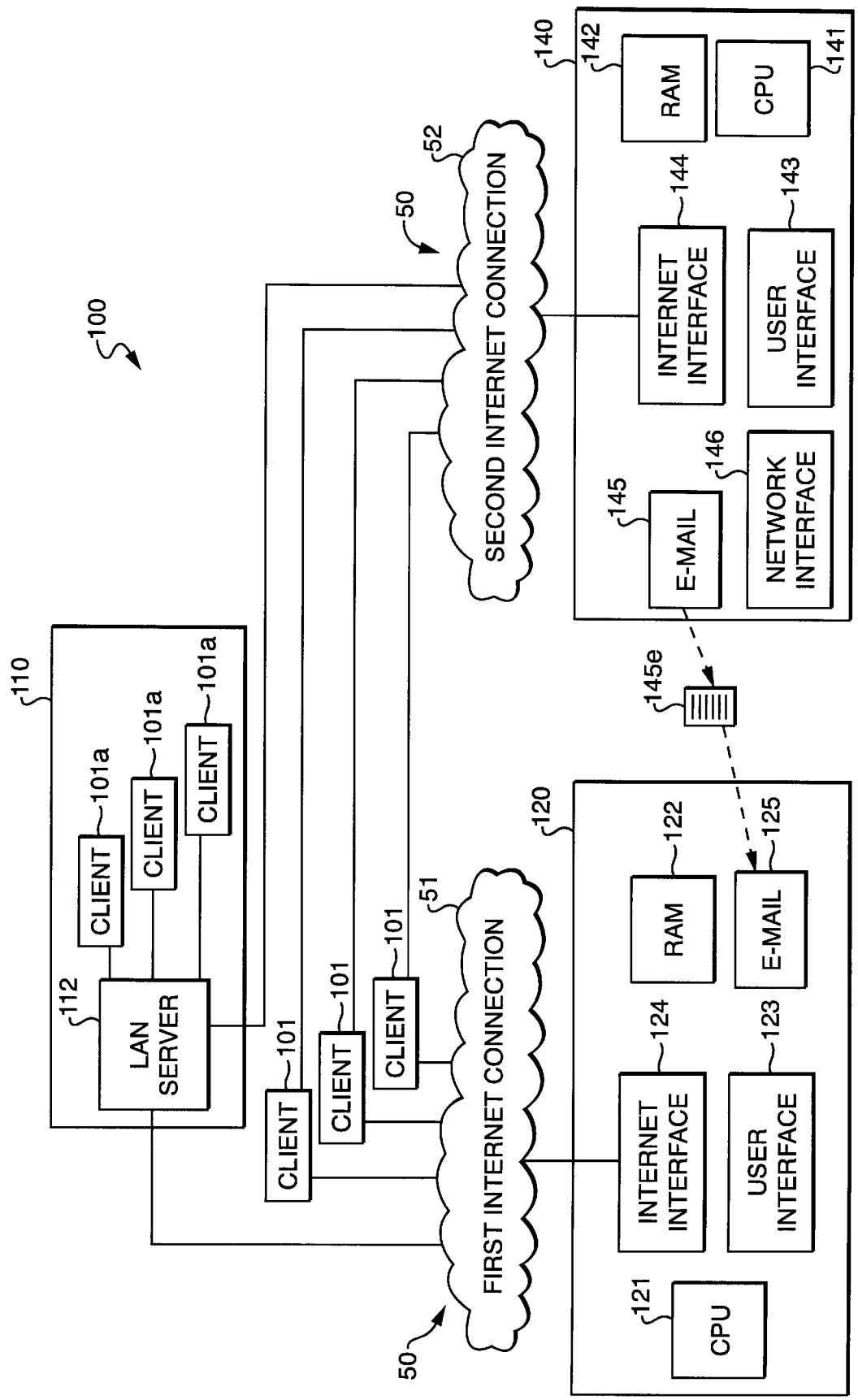
FIG. 1 is a schematic diagram showing a front-end portion of a system for preparing a customized printed product over a quasi-public communications network according to a preferred embodiment of the present invention.

With reference to FIG. 1, a system for preparing a customized printed product over a quasi-public communications network, such as the Internet 50, according to a preferred embodiment of the present invention includes a front-end portion 100 by which at least one end-user client computer 101 connects to, and communicates with, a wholesaler web server computer 140, via a retailer web server computer 120. The at least one client computer 101 may be a personal computer 101 connected to the Internet 50 either through a local Internet Service Provider ("ISP") or through a known commercial on-line service, for example, a proprietary dial-in network offered by companies such as America Online, CompuServe, Prodigy and Microsoft. Alternatively, the at least one client computer 101 may be one of several user computers 101a connected to one another in a conventional local area network ("LAN") 110 configuration, such as a inner-office network, and connected to the Internet 50 via a LAN server computer 112, to which all user computers 101a are connected, and which is itself connected to the Internet 50 either through an ISP or through a commercial on-line service as described hereinabove.

Although the Internet 50 has been shown herein to include at least first and second discrete connection components 51, 52, respectively, representation of the Internet 50 as such is shown herein for the purpose of illustration only. It is readily understood by those skilled in the art that the international network of networks conventionally known as the Internet 50 is indivisible in that the Internet 50 is defined by a plurality of redundant links between the plurality of host computers connected thereto. The first and second connection components 51, 52, respectively, are, in fact, one in the same; that being, the Internet 50.

The client computer 101 connects to the Internet 50 and communicates with the web server computers 120, 140 using conventional network communication, Internet addressing and data transfer means, such as, the transmission control protocol/Internet protocol ("TCP/IP"), the World Wide Web ("www"), hypertext transfer protocol ("http"), file transfer protocol ("ftp"), simple mail transport protocol ("smtp"), and the like.

The client computer 101 is furthermore provided with sufficient conventional hardware and software so as to enable an end-user thereof to connect to, and communicate with, the web server computers 120, 140 using the aforementioned conventional network communication, Internet addressing and data transfer means. For example, the client computer 101 may include conventional hardware and software such as, inter alia, a microprocessor, memory, storage devices (such as removable floppy drives or hard drives), a network communication device (such as a modem or a network interface card), a user interface including a display (such as a monitor) and input devices (such as a keyboard or mouse), an operating system and a web "browser" application to permit exchange of data between the client computer 101 and the web server computers 120, 140 using the aforementioned conventional network communication, Internet addressing and data transfer means over the Internet 50.

The client computer's web "browser" may further be adapted to interpret so-called "realtime" programming languages and commands, for example, the aforementioned "realtime" JAVA® programming language. Use of such "realtime" programming languages permits dynamic cross-exchange of data between the client computer 101 and the web server computers 120, 140 without requiring an application program to be installed on the client computer 101 first.

The retailer web server computer 120 includes sufficient conventional hardware and software so as to enable the retailer web server computer 120 to "host" an Internet web site having a unique Internet web address on the World Wide Web and using conventional protocols, such as http, to communicate therewith. For example, the retail web server computer 120 may include sufficient hardware and software such as, inter alia, a microprocessor 121, memory 122, a storage device (such as a hard drive), a user interface 123 having a display (such as a monitor) and input devices (such as a keyboard or mouse), and a network communication/interface device 124 to connect the retail web server computer 120 to the Internet 50. The retail web server computer 120 further includes means 125 to send and receive e-mail 145e using a conventional e-mail transfer protocol, such as smtp.

The wholesaler web server computer 140 includes sufficient conventional hardware and software so as to enable the wholesaler web server computer 140 to "host" an Internet web site having a unique Internet web address on the World Wide Web and using conventional protocols, such as http, to communicate therewith. For example, the wholesaler web server computer 140 may include sufficient hardware and software such as, inter alia, a microprocessor 141, memory 142, a storage device (such as a hard drive), a user interface 143 having a display (such as a monitor) and input devices (such as a keyboard or mouse), and a network communication/interface device 144 to connect the wholesaler web server computer 140 to the Internet 50. The wholesaler web server computer 140 further includes means 145 to send and receive e-mail 145e using a conventional e-mail transfer protocol, such as smtp.

Figure 2:
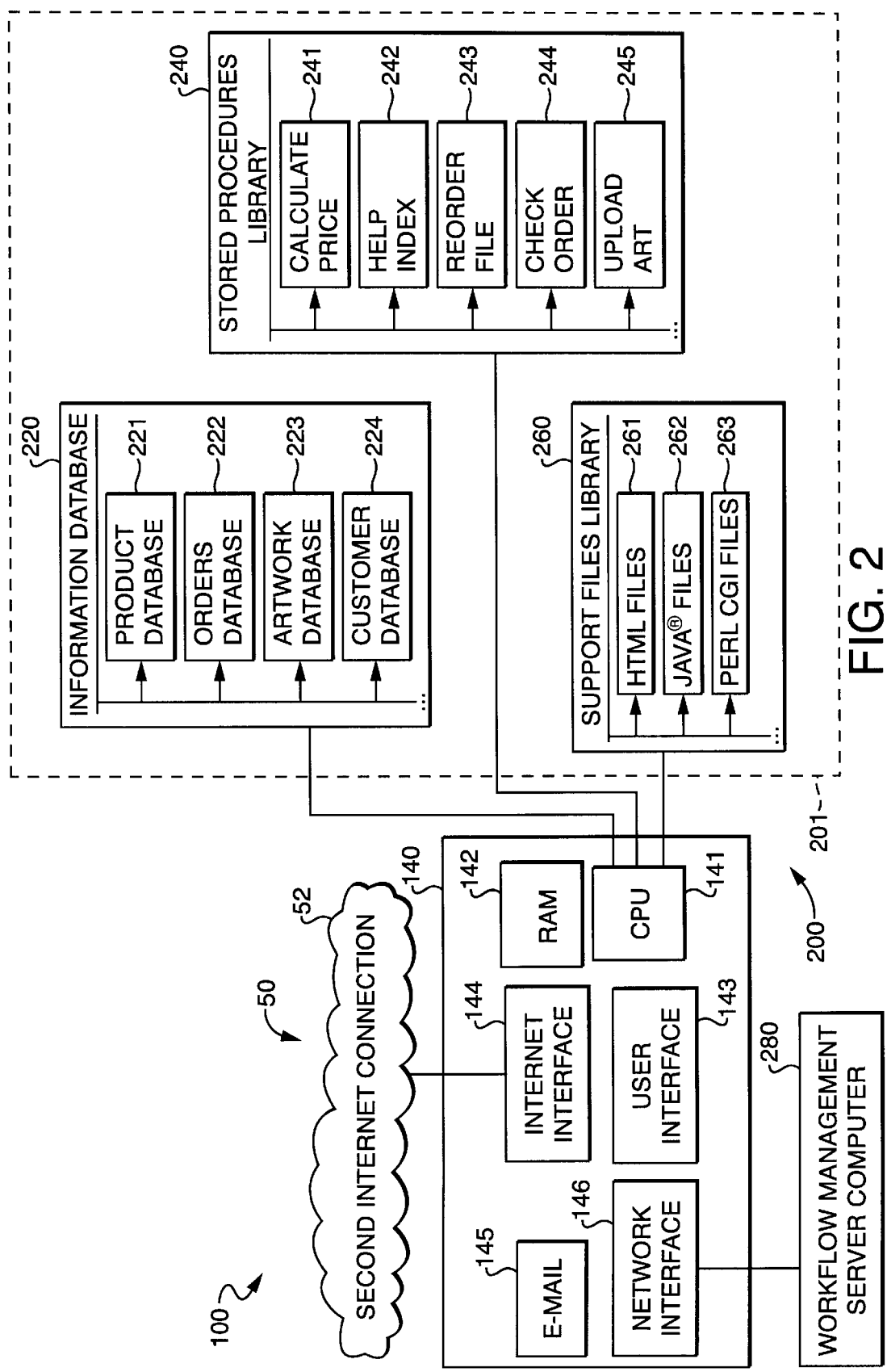
FIG. 2 is a schematic diagram showing a back-end portion of the system of FIG. 1.

With additional reference to FIG. 2, the system for preparing a customized printed product over the Internet 50 according to the preferred embodiment hereof includes a back-end portion 200 connected to the wholesaler web server computer 140 and supporting operation of the front-end portion 100 of the system by an end-user thereof. More particularly, the back-end portion 200 provides a printed products preparation system 201 having an information database 220, a stored procedures library 240 and a support files library 260. The information database 220 includes files, data and information relating to the objects of the system and method herein described, such as product information, end-user information, order information, and the like. The stored procedures library 240 includes files, programs, applications, applets, scripts, subroutines and the like, which are frequently used at many different locations within the preparation system 201, such as price calculator, customize a selected product, interactive help, reorder procedures, and the like. The support files library 260 includes files, programs, applications, applets, scripts, sub-routines and the like, which are necessary for operation of the system to perform as herein described. Preferably, the back-end portion 200 is installed on the wholesaler web server computer 140, such as, for example, as discrete files located on the wholesaler web server computer storage device, and access to the information database 220, the stored procedures library 240, the support files library 260, and the files contained respectively therein, is managed by the preparation system 201. Alternatively, the preparation system 201, including the information database 220, the stored procedures library 240 and the support files library 260 may be installed on a dedicated support computer (not shown) connected to the wholesaler web server computer 140 by an internal network connection means.

The information database 220 includes a plurality of interconnected and cross-indexable database sources of stored information. A product database 221 comprises a portion of the information database 220 and includes information relating to the types of customizable products available for purchase. For example, the information typically stored within the product database 221 includes product type (such as business card, letterhead, label, envelope), size (such as width and height dimensions) and permissible margins, stock, color and pricing relating thereto.

The information database 220 further includes an orders database 222 containing information relating to orders prepared and docketed on the retailers' respective dealer accounts. For example, the information typically stored within the orders database 222 includes end-user identification, order date and time, current state of the order (such as whether the order is pending approval by the retailer, is approved but is pending printing, is being held by the retailer pending further action, or is canceled), information obtained with reference to the product database 221 relating to the type, layout and quantity of the product ordered, and information relating to the shipping location.

The information database 220 even further includes an artwork database 223 containing information relating to fonts, graphics and images offered to all end-users, information relating to original artwork uploaded onto the wholesaler web server computer 140 by the end-user and available to the end-user who uploaded same, including the identification number of the end-users who are permitted to use any such original artwork.

The information database 220 also includes a customer database 224 containing information relating to the registered end-users of the preparation system 201, including the end-user's name, address, telephone number, e-mail address and password, and an identification of the retailer from whose web site the end-user gained access to the preparation system 201. Access to the preparation system 201 by a registered end-user may only be through the retailer identified in the customer database 224.

Each database 221, 222, 223, 224 contained within the information database 220 is cross-indexed such that the information contained in any one database 221, 222, 223, 224 is freely shared therebetween, as well as with the preparation system 201, generally. Additional databases (not shown) may be provided within the information database 220 and cross-indexed with the remaining databases 221, 222, 223, 224 to provide and organize any information hereafter determined to enhance efficient operation of the preparation system 201 as herein described.

The preparation system stored procedures library 240 contains programs, subroutines, applications, applets and files frequently used during typical operation of the preparation system 201 as herein described. For example, the stored procedures library 240 may include a procedure 241 to calculate a price after the end-user has completed the order. Because the end-user's desire to calculate the order price may occur frequently and from many different locations within the preparation system 201, such a procedure 241, if located in one database 240 which is accessible by any such location in which the end-user desires to calculate a price, eliminates the need for repetitive programming of such a procedure at each such location. Any such procedure may be placed within the stored procedures database 240. Additional stored procedures include an interactive help index procedure 242 (FIG. 18), a reorder file procedure 243 (FIG. 19), a check order status procedure 244 (FIG. 20) and an upload art procedure 245 (FIG. 21).

The preparation system support library 260 contains the programs, subroutines, applications, applets, scripts and files necessary to instruct the preparation system 201 how to guide the end-user therethrough in operating the system as herein described. More particularly, three types of files are stored within the support library 260—hypertext mark-up language ("html") files 261, JAVA® and JAVA® script files 262, and PERL common gateway interface ("CGI") files 263—although any files necessary for the preparation system 201 to operate as herein described may be stored within the support library 260. The html files 261 are used by the preparation system 201 to provide the basic structure of the wholesaler web site and of the preparation system 201 offered thereby, the JAVA® and JAVA® script files 262, as well as the PERL CGI files 263, are used by the preparation system 201 to present a dynamic "realtime" interface to the end-user, over the Internet 50, to enable the end-user to prepare a customized printed product without having to install a specific application program on the end-user's client computer 101.

Figure 3:
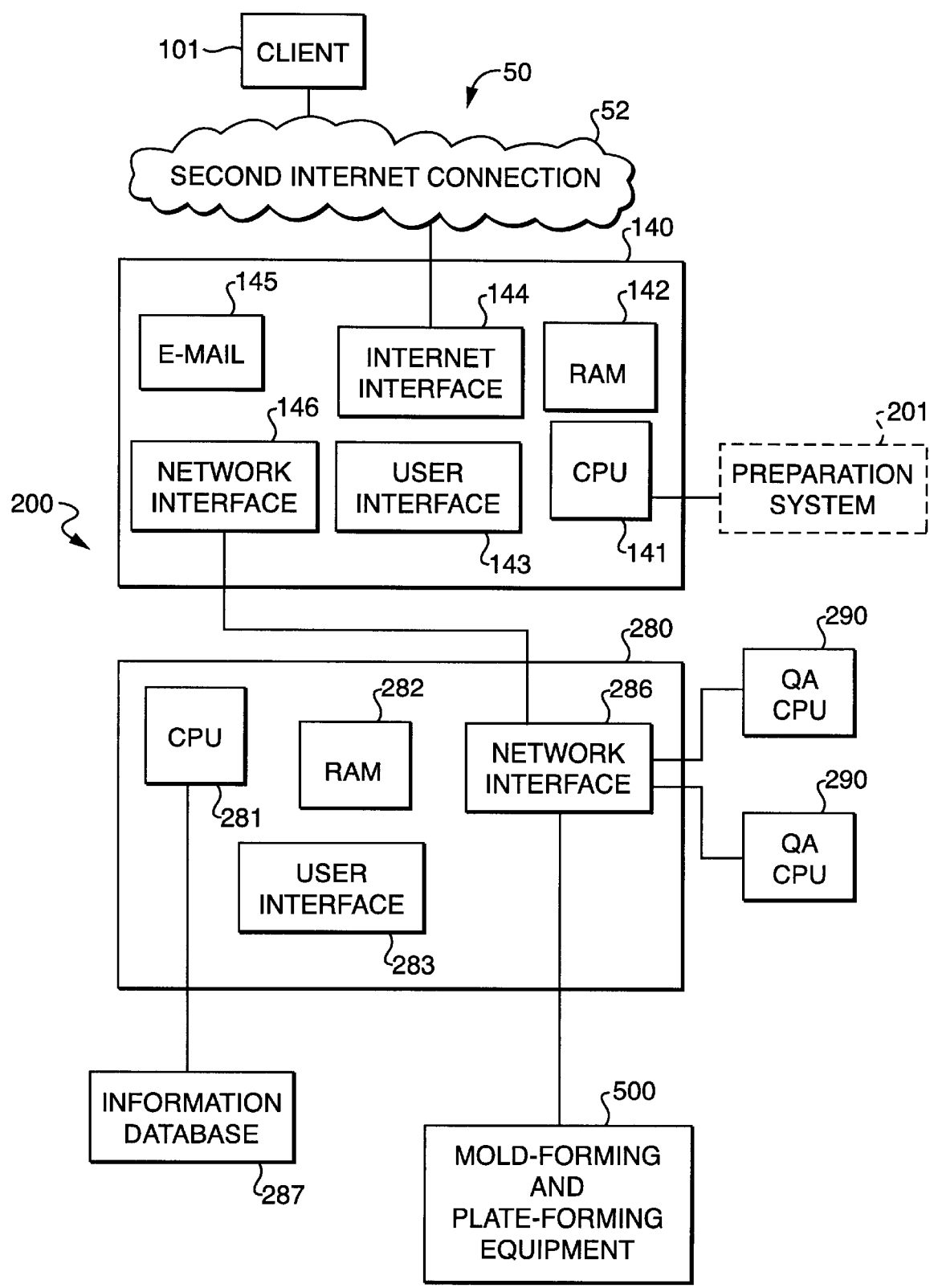
FIG. 3 is a schematic diagram showing a workflow management system connected to the back-end portion of the system of FIG. 1.

With additional reference to FIG. 3, the back-end portion 200 of the system for preparing a customized printed product over the Internet 50 according to the preferred embodiment hereof further includes a workflow management server computer 280 connected to the wholesaler web server computer 140 by an internal communication network. For example, the wholesaler web server computer 140 may include an ethernet network adapter card 146 installed therein which is connected by any suitable data communication means to an ethernet network adapter card 286 installed in the workflow management server computer 280. The workflow management server computer 280 further includes sufficient conventional hardware and software so as to enable the workflow management server computer 280 to receive an electronic file from the preparation system 201 containing the image of the customized printed product therein and to prepare the molds and plates needed to print a predetermined quantity of the printed product. For example, the workflow management server computer 280 may include sufficient hardware and software such as, inter alia, a microprocessor 281, memory 282, a storage device (such as a hard drive), a user interface 283 having a display (such as a monitor) and input devices (such as a keyboard or mouse).

An information database 287 is connected to, and communicates with, the workflow management server computer 280 to convert information received by the preparation system 201 into a format necessary to control and manage conventional mold-forming and plate-forming equipment 500 needed to print the customized printed product thereby.

At least one quality assurance ("QA") workstation 290 may be connected by conventional ethernet network means to the workflow management server computer 280 to permit viewing of the information received by the preparation system 201 prior to passing the information on to the mold-forming and plate-forming equipment 500 for preparation of the printing molds and plates.

Having thus described a system for preparing a customized printed product over a communications network according to the preferred embodiment hereof, the manner in which the system is operated, and a method for preparing a customized printed product over the communications network thereby according to a preferred embodiment hereof.

Preparatory to enabling an end-user to prepare a customized printed product over the Internet 50 using the system and method herein described, a printed products retailer establishes a web site addressable on the Internet 50, preferably on the World Wide Web thereof, and accessible by the end-user using a client computer 101, such as those described hereinabove. The retailer may be any retail sales operation of the type which ordinarily purchases printed products from a printed products wholesaler for retail sale to the end-user. For example, the retailer may be a local franchise photocopy kiosk of a national commercial printed products and photocopy service and supplies provider, in which case, the retailer web page may be hosted either by the individual franchise kiosk or by the franchised organization. Alternatively, the retailer may be an individual printed products supplies provider having a single store, in which case, the retailer web site is likely to be hosted by the individual retailer via a local ISP.

Even further, a wholesaler desiring to provide the system and method herein described must establish a web site addressable on the Internet 50, preferably on the World Wide Web thereof, and accessible by the retailer thereover using conventional network communications, Internet addressing and data transfer means. The wholesaler may be any manufacturing and wholesale operation having sufficient means and equipment to produce printed products for wholesale to a printed products retailer. For example, the wholesaler may be a print shop of the type which typically receives an order from a retailer to print a predetermined number of customized printed products, such as business cards labels or the like, pursuant to instructions given to the retailer by the end-user.

Before the end-user may access the system and method herein described, the retailer must first establish a dealer account with the wholesaler. The dealer account will serve as a basis for communication between the retailer and the wholesaler to facilitate operation of the system and method herein described. The wholesaler may provide access to the system and method herein described to numerous retailers, in which such case each such retailer would have its own dealer account with the wholesaler.

Figure 4:
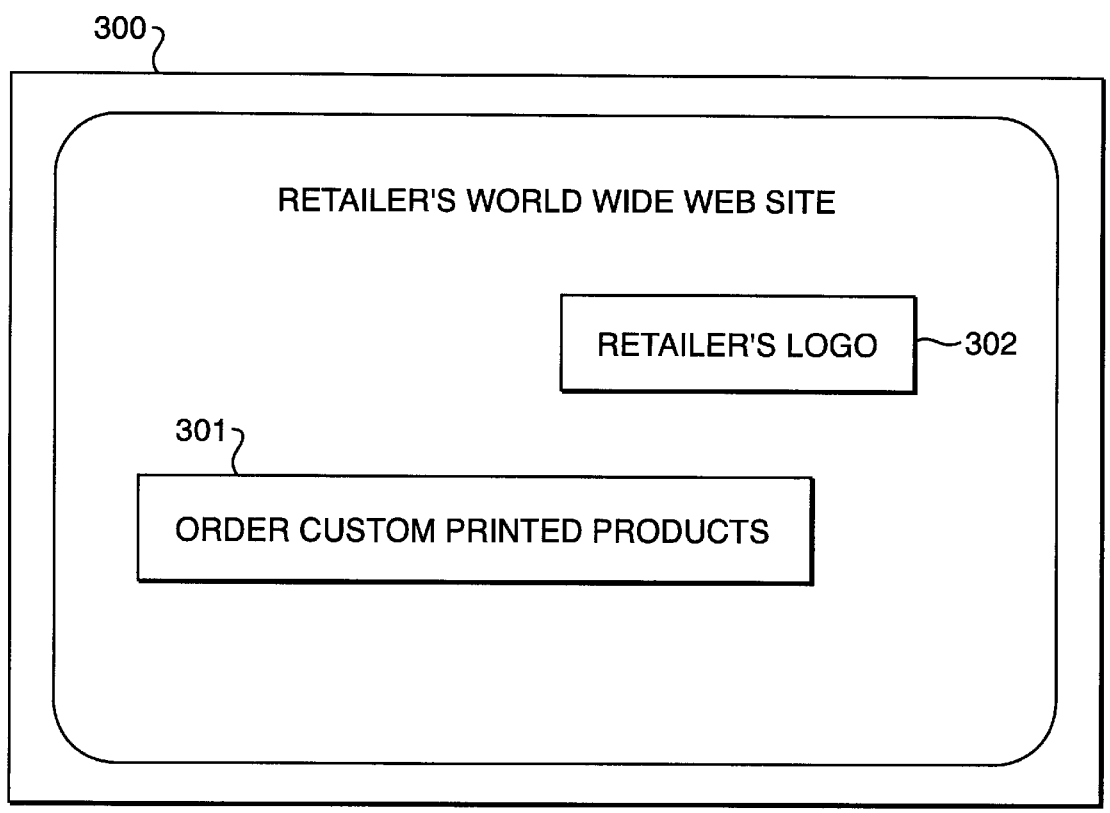
FIG. 4 is a schematic diagram of a retailer Internet web site "home page" showing a hypertext link to the system of FIG. 1.

With reference to FIG. 4, once the retailer's dealer account with the wholesaler has been established, the retailer defines a hypertext link 301 on the retailer's web site 300, the selection of which anonymously transfers the end-user from the retailer's web site 300 to the wholesaler's web server computer 140, and more particularly, to the preparation system 201 herein described. The retailer's hypertext link 301 may be placed anywhere on the retailer's web site 300, and preferably includes language, such as "Order Custom Printed Products", which is summarily descriptive of the system and method herein described, but does not expressly identify the wholesaler, the wholesaler's web site, the preparation system 201 or the wholesaler's web server computer 140.

With additional reference to FIG. 1, an end-user desiring to prepare a customized printed product over the Internet 50 using the system herein described, and according to the method herein described, connects to the retailer web server computer 120 in any suitable, conventional manner via a first Internet connection 51. Preferably, the retailer web site 300 includes certain html files published on the World Wide Web which the end-user computer 101 accesses over the Internet 51 by any conventional means, for example, by connecting to the Internet 51 via a local ISP or via a commercial on-line service such as those described hereinabove. Once connected to the Internet 51, the end-user directs the Internet browser program installed on the end-user's client computer 101 to the retailer's web site 300. For example, the end-user enters the unique domain name or Internet Protocol ("IP") address of the retailer web server computer 120 in the browser's Uniform Resource Locator ("URL") field, thereby displaying the html file associated with the retailer's so-called web site "home page" 300 on the video display of the end-user's client computer 101. The end-user may thereafter navigate through the retailer's web site 300 using conventional techniques such as selecting hypertext links provided thereon to various files on the retailer's web server computer 120, as well as to various files located on other web server computers located throughout the Internet 50.

Alternatively, the retailer may provide direct, so-called "dial-in", telephone access to the retailer web server 120, by which the end-user's client computer 101 may access the retailer web server 120, and the retailer web site 300 thereon, using a modem installed in the client computer 101, conventional telephone lines and conventional data transmission means by which the client computer 101 may connect to, and communicate with, the retailer web server computer 120.

Figure 5:
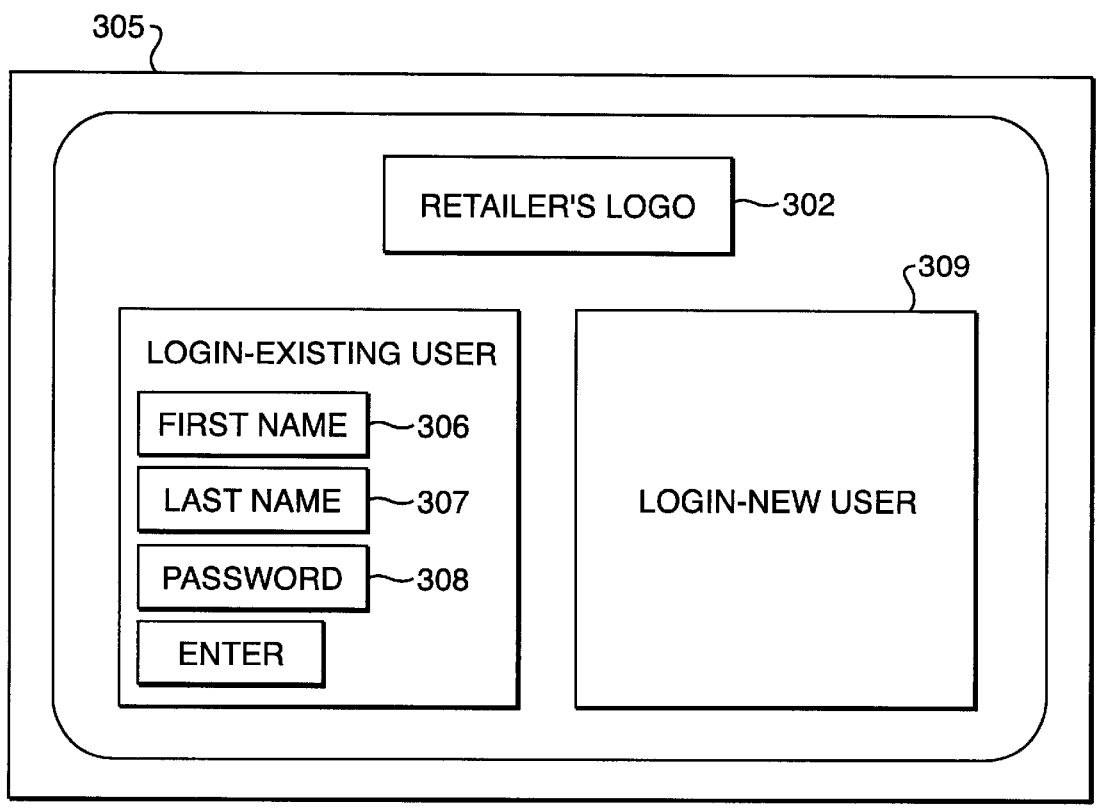
FIG. 5 is a schematic diagram of an anonymous wholesaler web site login screen of the system of FIG. 1, showing indicia of a retailer through which an end-user gains access to the wholesaler web site.

With additional reference to FIG. 5, upon locating and selecting the hypertext link 301 to the wholesaler's web-server computer 140, and more particularly, to a login screen 305 of the preparation system 201 (FIG. 2), the end-user's client computer 101 is anonymously transferred thereto via the hypertext link 301 thereto over a second Internet connection 52. The login screen 305 is preferably an html file located on the wholesaler's web server computer 140 and is designed to identify the retailer's web site 300 from which the end-user gained access to the anonymous wholesaler's web server computer 140. Indicia 302 unique to that retailer, such as a company logo or the like, is on the login screen 305. Further, the login screen 305 is designed to display the URL of the retailer web site 300, and of the particular file located thereon, rather than the URL of the anonymous wholesaler web server computer 140, from which the end-user gained access to the wholesaler's web server computer 140. Even further, retailer indicia 302 and the retailer's URL are displayed on all screens, pages and files of the preparation system 201 herein described. Thus, at all times throughout the end-user's preparation of a customized printed product using the system and method herein described, the end-user is given no indication that the end-user's client computer 101 is connected to anything other than the retailer web server computer 120, thereby presenting the appearance that the end-user remains connected to the retailer web server 120 throughout the remaining steps of the method herein described, and further that the preparation system 201 is a service being offered by the retailer, not the wholesaler. Such an anonymous transfer from the retailer web server computer 120 to the wholesaler web server computer 140 preserves the retailer-wholesaler relationship, encourages the end-user-retailer relationship and fosters goodwill of the end-user with respect to the retailer.

Figure 17:
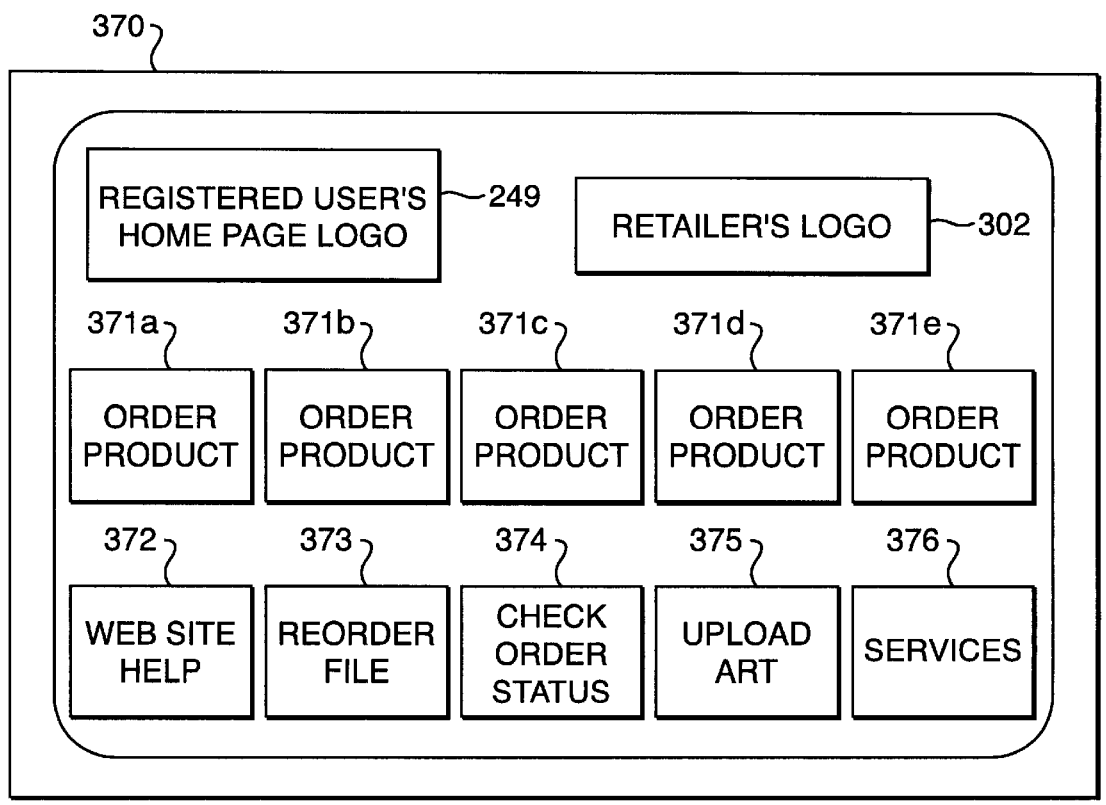
FIG. 17 is a schematic diagram of a registered end-user's "home" screen of the system of FIG. 1.

The end-user logs in to the preparation system 201 in either one of two manners. If the end-user has previously used the preparation system 201, had then registered as an existing user of the preparation system 201 and had then accessed the preparation system via the same retailer web site 300 from whose web site the end-user now accesses same, the end-user may enter his/her first and last names, along with a previously-entered password in the respective data entry fields 306, 307, 308. Such information is verified with reference to the information database 220, and particularly with reference to the customer database 224. If the end-user's first and last names, and password are found in the customer database 224, certain end-user defaults, including previously-ordered customized products, are thereby accessible by the end-user and the end-user may proceed through the preparation system 201 as further described hereinbelow, beginning at the end-user's "home" screen 370 (FIG. 17).

However, in the alternative, either the end-user's first name, last name or password does not appear in the customer database 224. This may be because the end-user has never used the preparation system 201 before, because the end-user has used the preparation system 201 before, but had then accessed the preparation system 201 from a retailer different than the retailer from whose web site the end-user now seeks access thereto, or because the end-user incorrectly entered his/her first name, last name or password. In any of the above scenarios, a message (not shown) may appear momentarily, indicating that the end-user's account information was not found in the customer database 224, at which point, the end-user would again be presented with the login screen 305. If the end-user recognizes that the incorrect end-user account information was entered the previous time, the end-user may enter the correct information, at which point certain end-user defaults, including previously-ordered customized products, are thereby accessible by the end-user and the end-user may proceed through the preparation system 201 as further described hereinbelow, beginning at the end-user's "home" screen 370 (FIG. 17).

The second, preferred, manner by which the end-user may access the preparation system 201, is to select a hypertext link 309 presented on the login screen 305, having the words "Login—New User", or the like, displayed thereon. This manner of accessing the preparation system 201 occurs either when the end-user has never used the preparation system from any retailer web site or when the end-user has used the preparation system previously, but from a retailer web site different than the retailer web site from which the end-user then accessed same.

Figure 6:
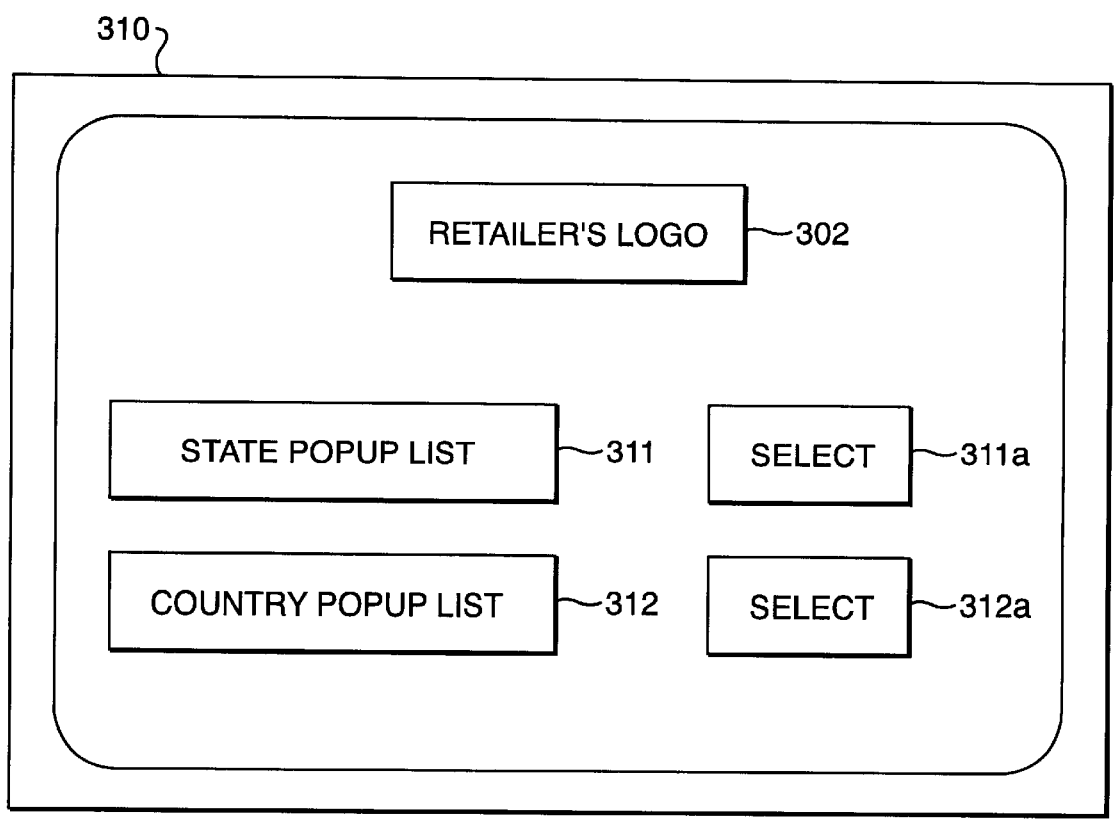
FIG. 6 is a schematic diagram of a first locator screen of the system of FIG. 1, showing a state popup list and a country popup list.

With reference to FIG. 6, a new end-user accessing the preparation system 201 from the web site of a franchised printed products services and supplies company, is presented to a first locator screen 310, requesting the end-user to identify the location of the state and country of the particular franchised retail store through which the end-user wishes to transact business relating to the method herein described. The first locator screen 310 includes a state popup list 311 having a number of predefined states listed thereon, a country popup list 312 having a number of predefined countries listed thereon corresponding to the countries within which the states listed on the state popup list 311 are located, and a select button 311a, 312a corresponding to each popup list 311, 312, respectively. The information contained on the state popup list 311 and on the country popup list 312 are obtained from the information database 220 and is recorded in the customer database 224 as a part of a new end-user's customer profile for future use as a registered user.

Figure 7:
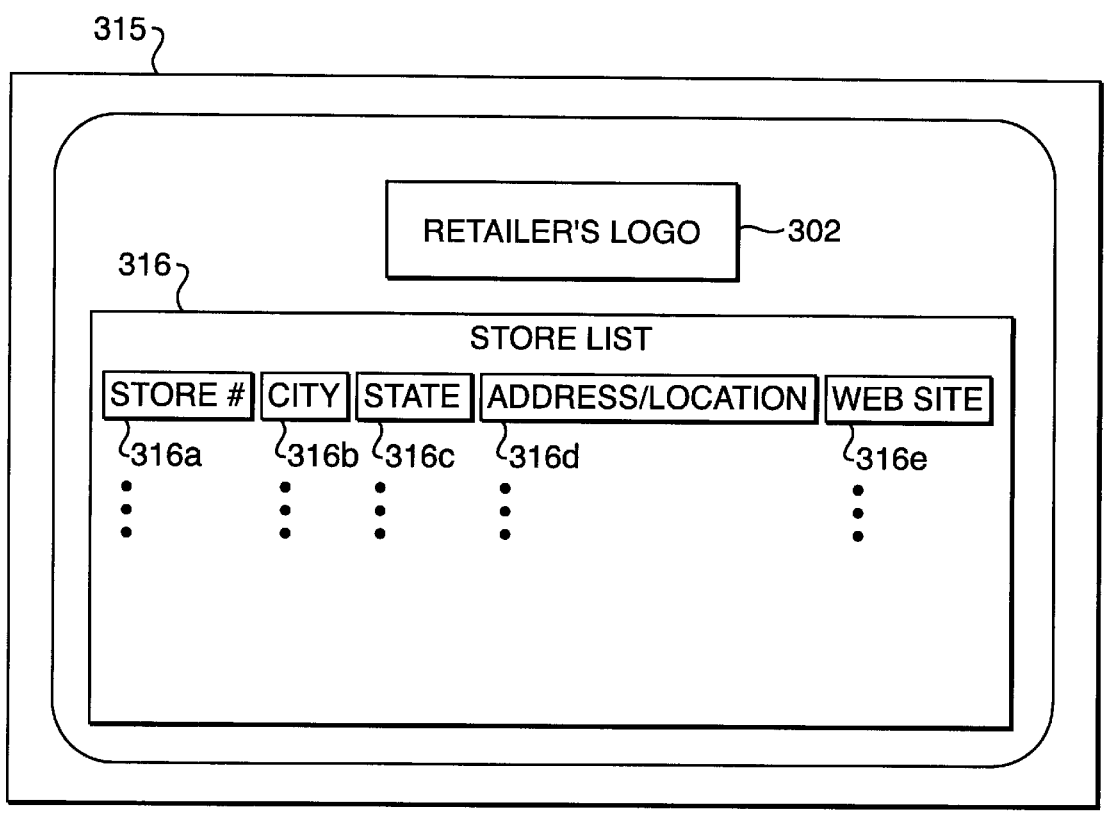
FIG. 7 is a schematic diagram of a second locator screen of the system of FIG. 1, showing a store selector list.

With additional reference to FIG. 7, and upon the end-user's selecting a state and country of the desired franchised retail store, the end-user is then presented with a second locator screen 315, requesting that the end-user particularly identify the franchised retail store located in the state and country specified earlier in the first locator screen 310, and through which the end-user wishes to transact business relating to the method herein described. The second locator screen 315 includes a store list 316 having all franchised retail stores located within the state and country previously selected by the end-user in the first locator screen 310. The store list 316 is generated with reference to the information database 220 and may contain particular information relating to each retail store listed thereon such as store number 316a, city 316b, state 316c, address 316d and web site address 316e. The retail store chosen by the end-user is recorded in the customer database 224 as a part of the new end-user's customer profile for future use as a registered user. Once the new end-user has indicated the preferred state, country and store through which the end-user wishes to transact business relating to the method herein described, and registers as a new end-user, the end-user cannot change this information with respect to the end-user's current registration profile, but must instead register as a new end-user to define new preferences, such as a new franchised retail store. End-user defaults, including previously prepared customized printed products, are preferable not transferrable from one end-user profile to another, thereby promoting end-user-retailer loyalty.

Figure 8:
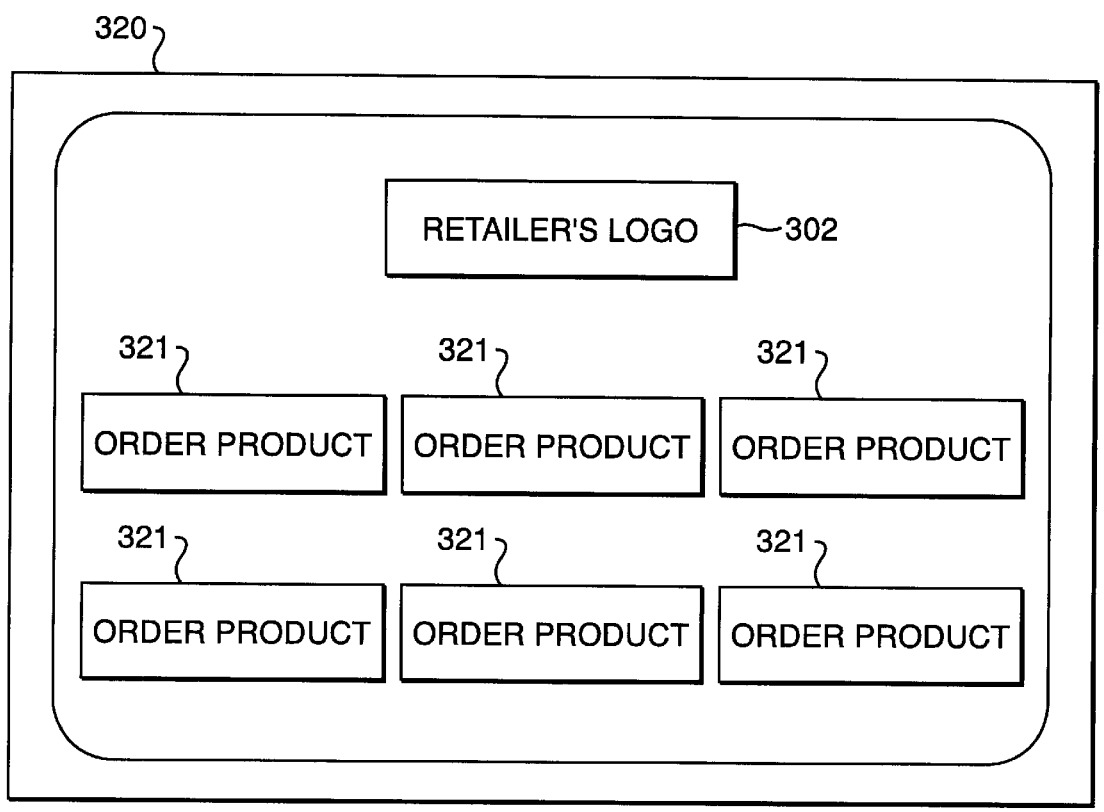
FIG. 8 is a schematic diagram of a choose product screen of the system of FIG. 1, showing a plurality of hypertext links thereon.

With reference to FIG. 8, and upon selecting the information requested on the first and second locator screens 310, 315, respectively, the end-user is presented with a choose product screen 320, requesting that the end-user select a product to customize and prepare. An end-user gaining access to the preparation system 201 from the web site of an individual printed products supplies retailer having only one store (or having several closely-located stores, but having only one ordering location) is not requested to identify the state, country and store through which the end-user wishes to deal because only one such store exists. As such, an end-user gaining access to the preparation system 201 from such an individual retail store bypasses the first and second locator screens 310, 315, respectively, and is presented with the choose product screen 320 immediately following the login screen 305.

A hypertext link 321, preferably shown as a button, is provided on the choose product screen 320 for each of the products which may be customized and ordered using the system and method herein described. For example, a hypertext button 321 may be provided to prepare pressure-sensitive labels, business cards, business and personal stationary, personal greeting cards, and the like. The types of products offered on the choose product screen 320, and the hypertext links 321 corresponding thereto, depends on the particular retailer from whose web site the end-user gained access to the preparation system 201. For example, some retailers may wish to provide ordering of specialty printed products, such as rubber stamps, calendars, tee shirts, and the like. The types of products available through each retailer, and the corresponding hypertext link 321 relating thereto, is predefined by the retailer in establishing the retailer's dealer account and is stored in the information database 220 with reference to a product ID unique to each product, respectively.

Figure 9:
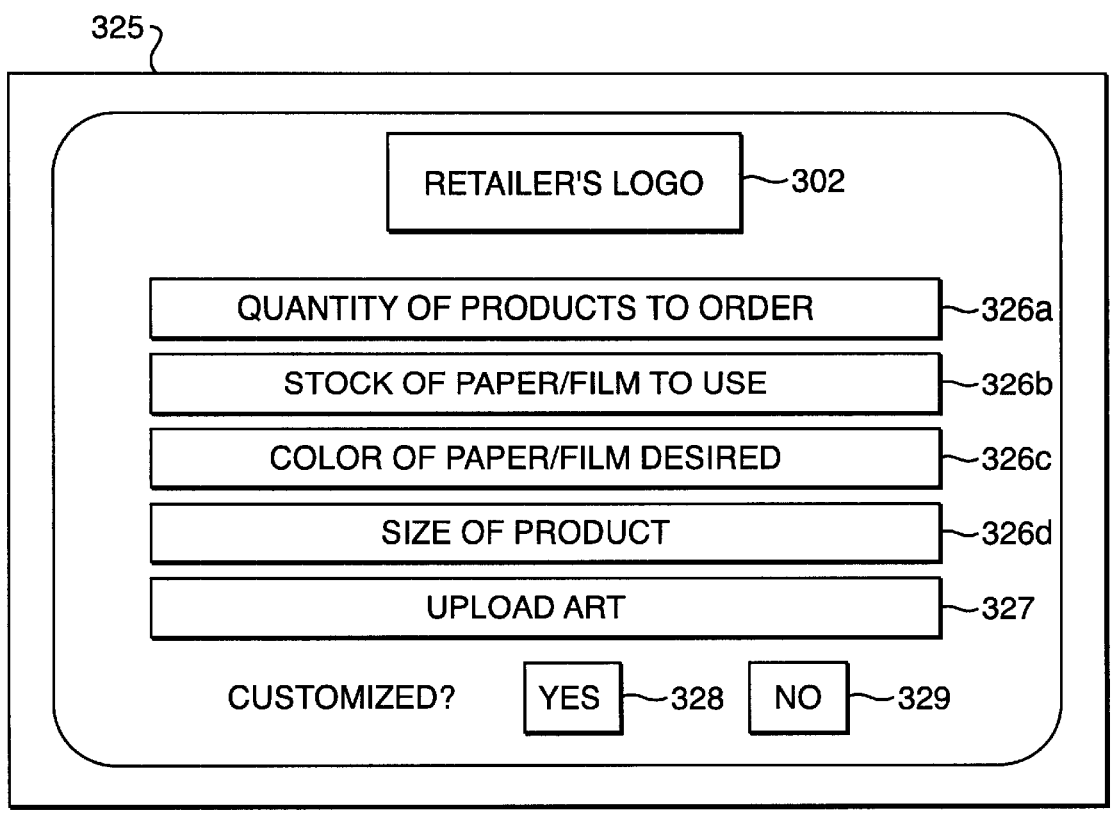
FIG. 9 is a schematic diagram of an order information screen of the system of FIG. 1, showing a plurality of specification selection fields thereon.

With reference to FIG. 9, and upon selecting a product to prepare and order, the end-user is presented with an order information screen 325, having one or more order specification selection fields 326a, 326b, 326c, 326d thereon, each selection field 326a, 326b, 326c, 326d representing a different specification relating to the product as selected in the choose product screen 320. For example, a first popup list 326a might be provided for the end-user to select the quantity of printed products desired, a second popup list 326b might be provided for the end-user to select the thickness of the paper desired, a third popup list 326c might be provided for the end-user to select the color of the paper desired, and a fourth popup list 326d might be provided for the end-user to size of the printed product. Any number of popup lists, or other similar selection means, may be provided on one or more screens. The type of information required to be entered by the popup lists, and the values of the information contained therein, depends on the type of product identified in the choose product screen 320, as determined by the product ID and with reference to the information database 220, and more particularly, with reference to the product database 221.

The order information screen 325 also includes a hypertext link 327, preferably a button, which executes a procedure stored in the stored procedures library 240, the selection of which enables the end-user to electronically transfer ("upload") an electronic file containing original artwork, such as a company logo, from the end-user's client computer 101 to the artwork database 223 via the Internet 50. The uploaded art is then associated with the end-user's registered account and usable by the end-user for the present, as well as for future, orders.

Figure 10:
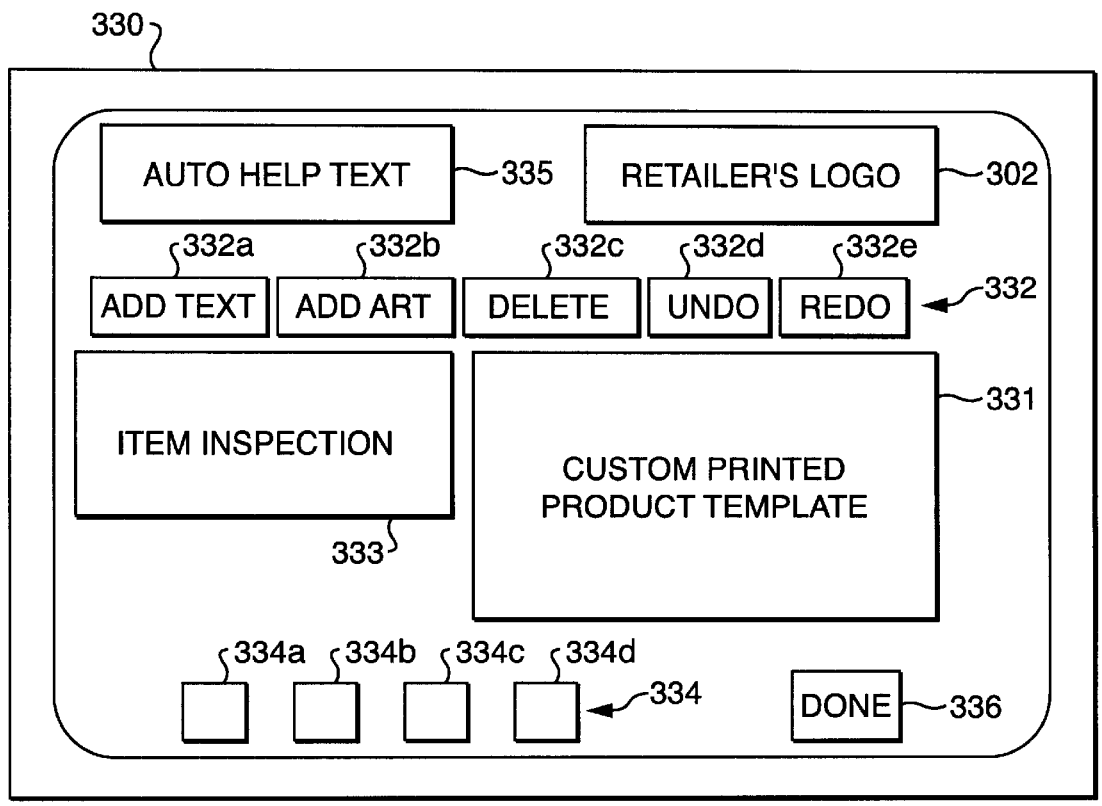
FIG. 10 is a schematic diagram of a "realtime" design layout applet of the system of FIG. 1.

Upon selecting all required order information on the order information screen 325, the end-user then designates by either a "Yes" hypertext button 328 or a "No" hypertext button 329 whether he/she wishes to prepare a customized design layout for the selected product having the specifications earlier selected. With reference to FIG. 10, selecting the "Yes" hypertext button 328 (FIG. 9) executes a dynamic "realtime" design layout applet, preferably written in the JAVA® programming language, and presents a layout tool applet window 330 by which the end-user may customize the layout of the specified product.

The layout tool applet window 330 includes a customized product image template 331, initially having a blank image with the chosen specifications, such as product size and shape, of the selected product, and a number of layout tool fields 332, 333, 334. For example, a first layout tool field 332 may contain one or more individually-selectable action buttons, each button corresponding to a specific action to be taken, such as "Add Text" 332a, "Add Art" 332b, "Delete" 332c, "Undo" 332d and "Redo" 332e. A desired design and layout is defined on the image template 331 using the action buttons 332a, 332b, 332c, 332d, 332e as herein described.

A second layout tool field 333 may include a dynamic data-entry field which changes depending on the action button 332a, 332b, 332c, 332d, 332e selected. For example, in response to selecting the "Add Text" action button 332a, the second layout tool field 333 may include a first popup list having a predefined list of selectable fonts thereon, a second popup list having a predefined list of selectable font sizes thereof, and a data-entry field into which the end-user would enter the text to be added to the image template 331. Even further, for example, in response to the end-user's selecting the "Add Art" action button 332b, the second layout tool field 333 may include a list of all available graphic images and artwork, including any artwork uploaded by the end-user, for selection and insertion on the image template 331.

A third layout tool field 334 may include a number of predetermined, individually-selectable color buttons 334a, 334b, 334c, 334d, which the end-user may select for any element previously placed on the image 331. The end-user uses the layout tool fields 332, 333, 334 to add, delete and position text, images, graphics and artwork to the image template 331 until a desired layout is completed. During preparation of the image template 331, an auto help field 335 dynamically presents suggestions and other helpful advice to the end-user in response to the end-user's actions. For example, in response to selecting the "Add Text" action button 332a, the auto help field 335 may state "Type the text you want in the space below. Click and drag the mouse to move the text on to the template. Select an ink by clicking on a color.", or other similar statement.

Figure 11:
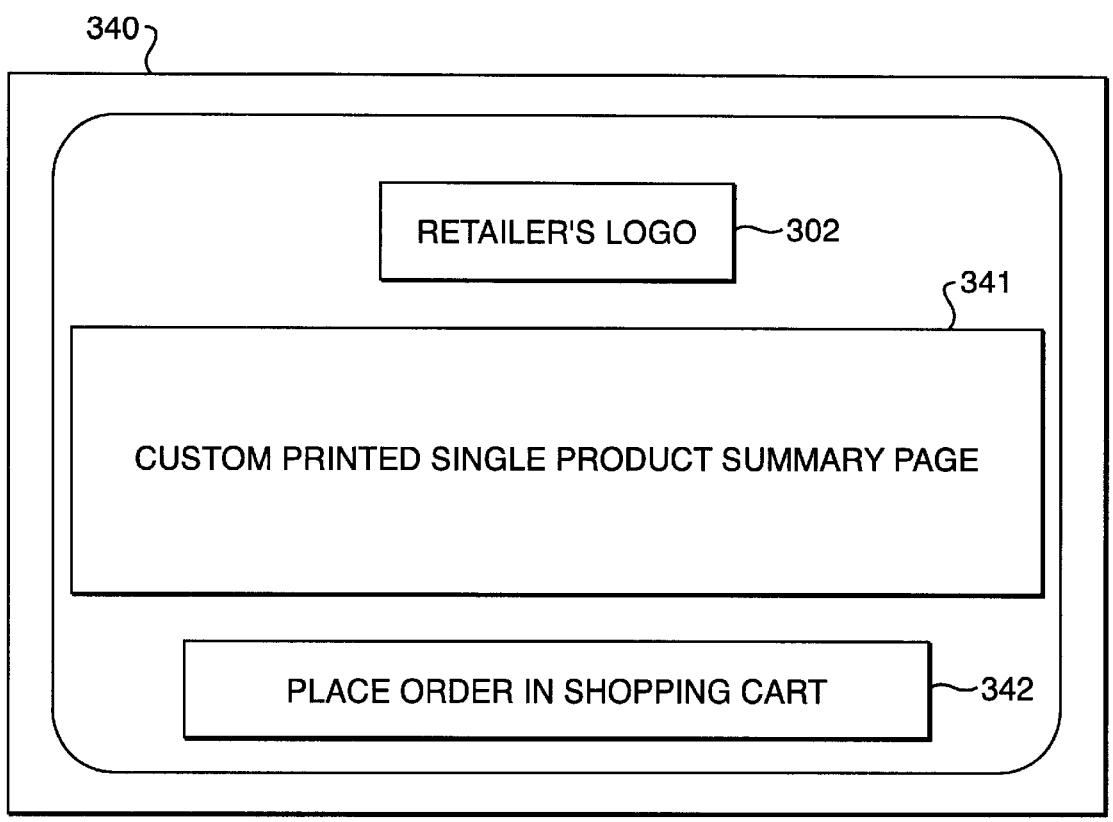
FIG. 11 is a schematic diagram of a single product summary screen of the system of FIG. 1.

Once the end-user has completed the design and layout of the customized printed product, he/she selects a hypertext button 336 labeled "End", "Done" or the like. A new order file is created by a new order stored procedure, saving the customized design and layout of the printed product, including ordering information, and is associated with the end-user's client account. With reference to FIG. 11, execution of the design layout applet ceases and a single product summary screen 340 is displayed for the end-user, identifying the customized printed product and showing a list 341 containing the order information thereon relating to the product selected and customized immediately prior to the single product summary screen 340. Any additional products previously selected and customized by the end-user during that end-user's session would not be displayed in the list 341.

Figure 12:
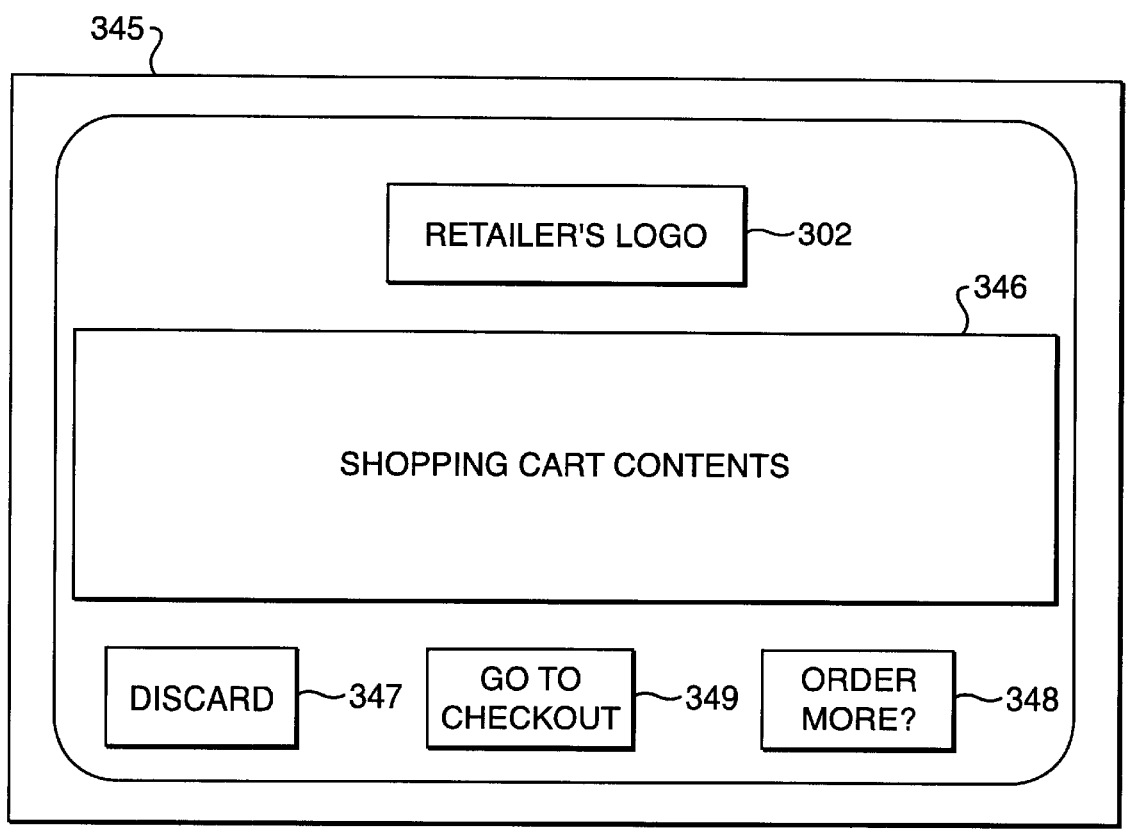
FIG. 12 is a schematic diagram of a shopping cart screen of the system of FIG. 1.

With reference to FIG. 12, accepting the single product summary screen, such as, for example, by selecting a hypertext button 342 (FIG. 11) labeled "Place Order in Shopping Cart", or the like, presents the end-user with a shopping cart screen 345, thereby displaying a list 346 of all customized printed products being ordered during the end-user's session. A "Discard" hypertext button 347 may be provided by which the end-user may discard a selected product from the shopping cart list 346. If the end-user wishes to prepare an additional product to order during that session, he/she selects a hypertext button 348 labeled "Order More Products", or the like, at which point the end-user returns to the choose product screen 320 (FIG. 8) and the above process is repeated.

A hypertext button 348a labeled "Order Related Products", or the like, may be selected by the end-user to execute the "realtime" design layout applet from the shopping cart screen 345, by which the end-user may add related products, for example, pads of self-adhesive note paper, envelopes, personalized note pads, and the like, directly to the shopping cart list 346, either with or without customization thereof. As each related product is selected for order, the product ID relating to the selected product is stored in the orders database 222.

Figure 13:
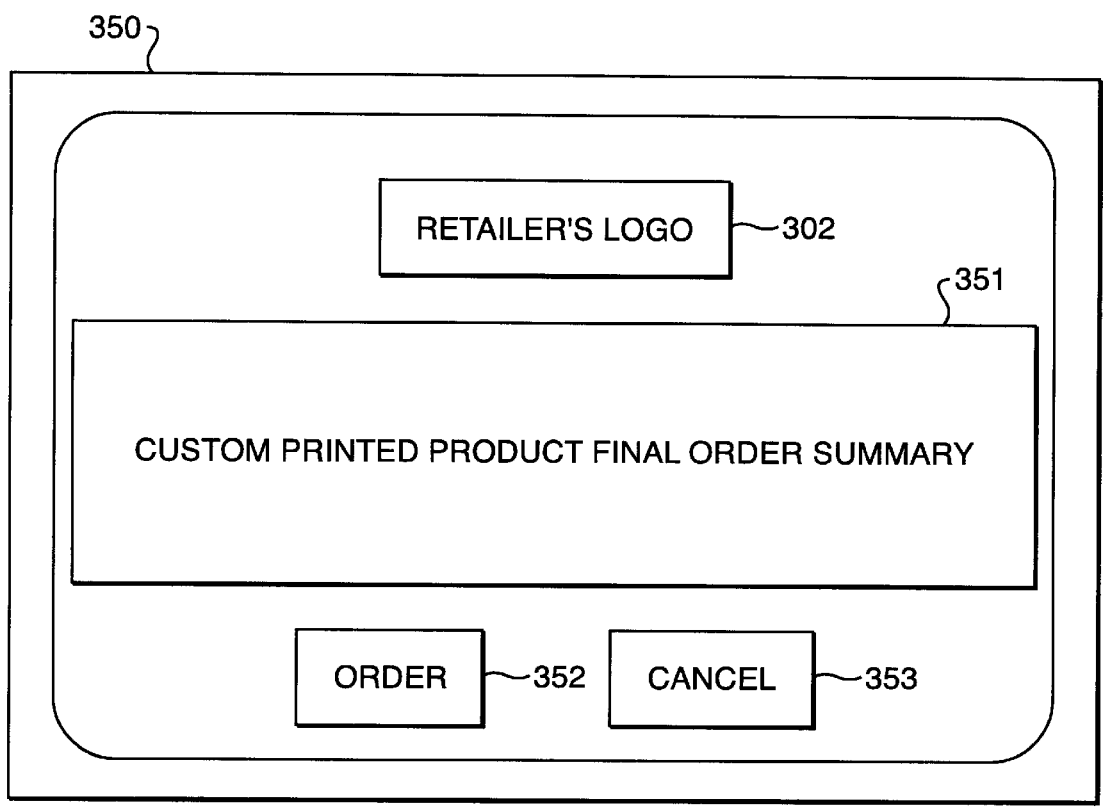
FIG. 13 is a schematic diagram of a final order summary screen of the system of FIG. 1.

Once the end-user has selected all customized printed products and related products into the shopping cart list 346, the end-user selects a hypertext button 349 labeled "Go to Checkout", or the like. With reference to FIG. 13, the end-user is then presented with a final order summary screen 350, showing a list 351 of all products being ordered during that end-user's session and including all related products therein. The information contained in the final order list 351 is obtained from the orders database 222. An "Order" hypertext button 352 is provided at some location on the final order summary screen 350, selection of which by the end user prompts the end-user to indicate certain billing information. A "Cancel" hypertext button 353 may also be provided on the final order summary screen 350, selection of which cancels the order and returns the end-user to a previous screen, for example, the login screen 305 (FIG. 5).

Figure 14:
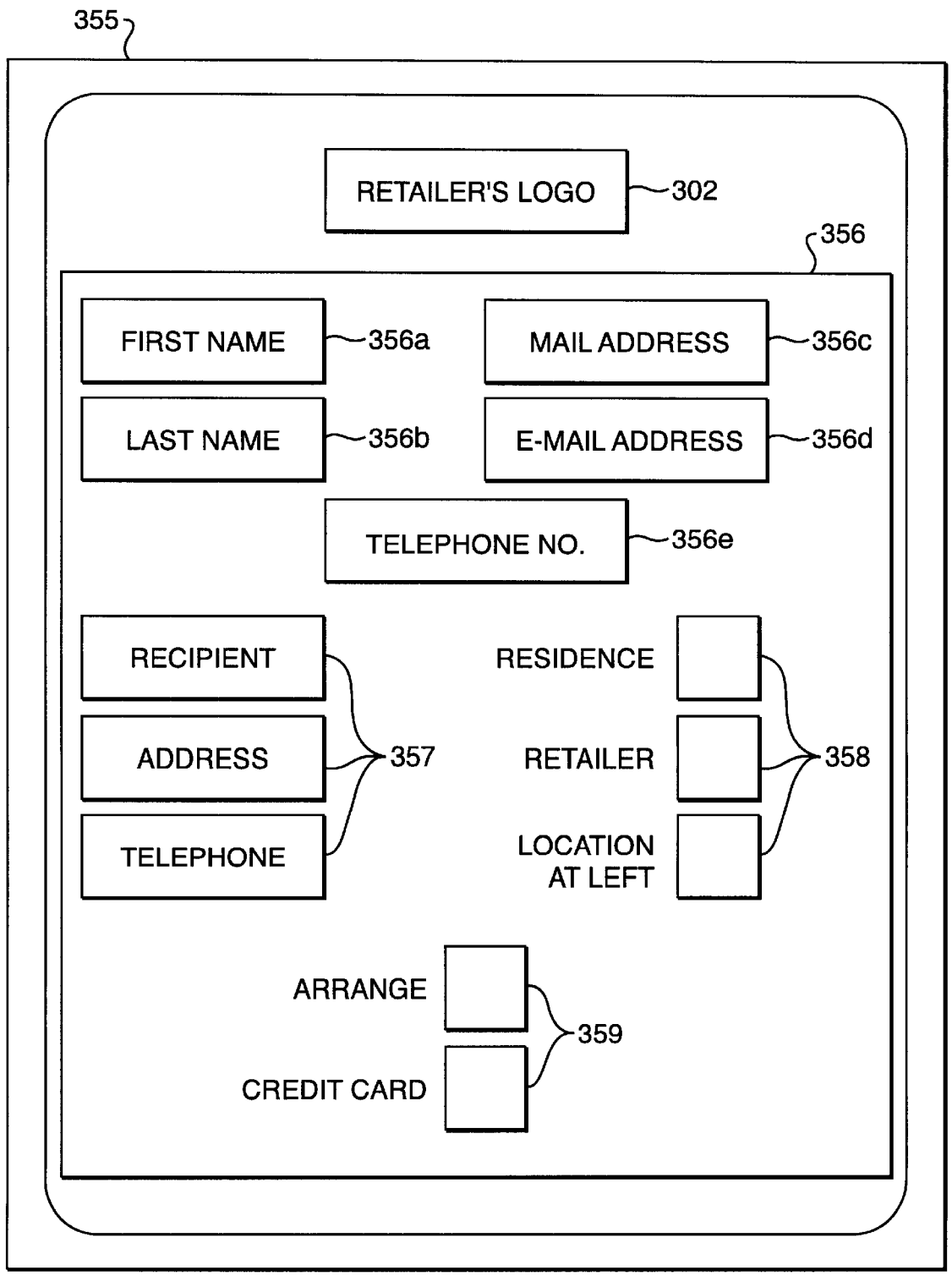
FIG. 14 is a schematic diagram of a customer info screen of the system of FIG. 1.

With reference to FIG. 14, and in response to the end-user's selecting the "Order" button 352 on the final order summary screen 350 (FIG. 13), a customer information screen 355 is displayed having one or more data entry fields for obtaining certain customer and billing information from the end-user. For example, fields may be provided for the end-user's first and last names 356a, 356b respectively, for the end-user's mail address 356c and e-mail address 356d, and for the end-user's telephone number 356e. One or more fields 357 may also be provided for the end-user to specify a location to which the printed order should be shipped when completed. The shipping address fields 357, may be used in combination with several check-boxes 358, which summarily indicate where the printed order should be sent. For example, a first check-box may be selected to indicate that the order should be shipped to the end-user's residence; another check-box may be selected to indicate that the printed order should be sent to the chosen retailer location; or, another check-box may be selected to indicate that the printed order should be shipped to the shipping address specified in the shipping address fields 356. To provide clarity, only one check-box should be selectable at a time. Accordingly, the check-boxes 358 may be replaced by so-called "radio buttons" which permit selection of only one thereof at a time.

A payment method field 359 may be provided on the customer information screen 355 having more or more fields for indicating how the order should be paid. For example, a first check-box may be selected to indicate that the end-user intends to contact the retailer to arrange for payment; and, another check-box may be provided to indicate that the end-user wishes for his/her credit card to be billed. To provide clarity, only one check-box should be selectable at a time. Accordingly, the check-boxes 359 may be replaced by so-called "radio buttons" which permit selection of only one thereof at a time. If the end-user indicates that a credit card should be billed, additional data-entry boxes may be provided to obtain the necessary credit card information, including account number, expiration date and billing address.

Figure 15:
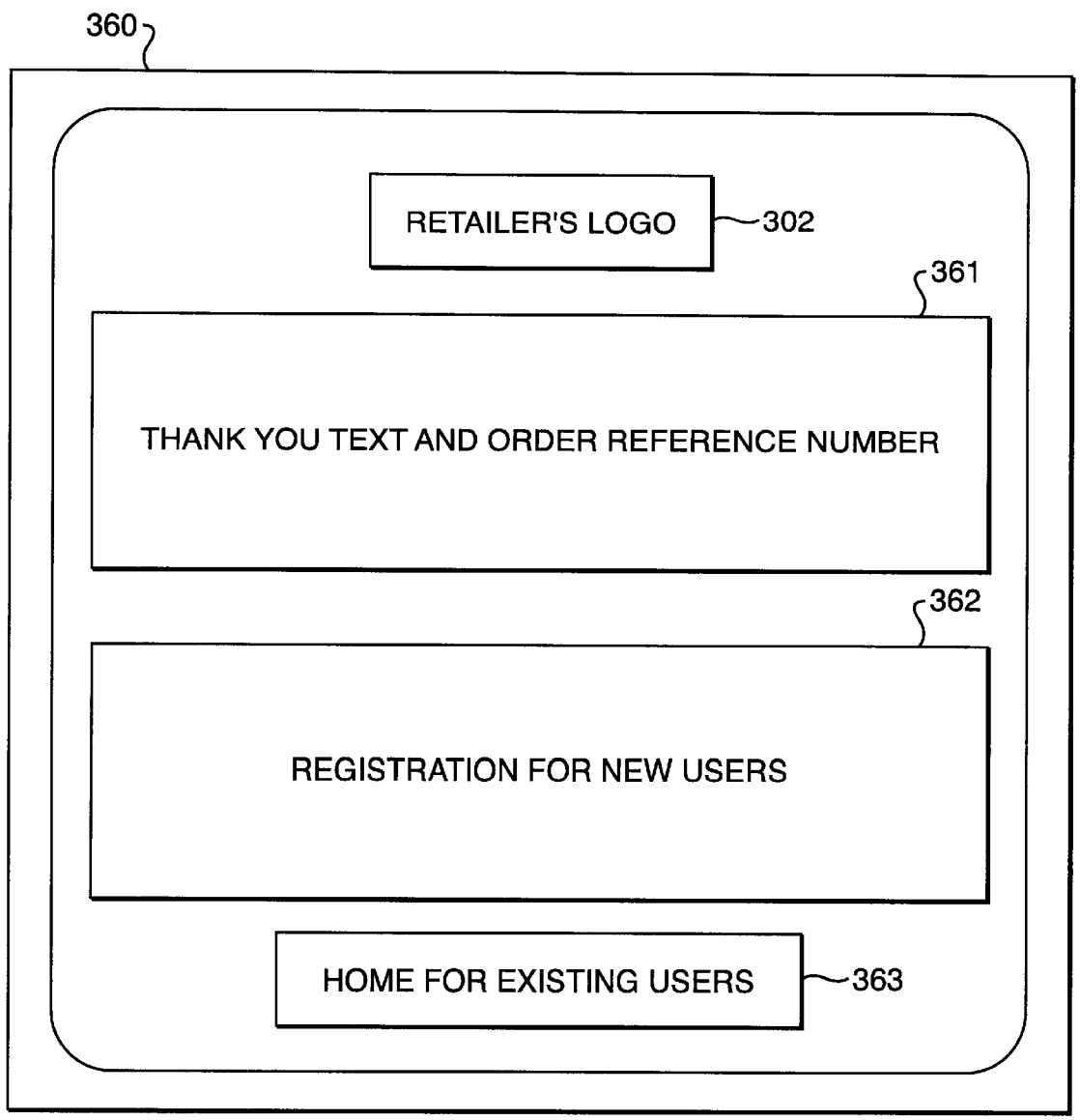
FIG. 15 is a schematic diagram of a thank you screen of the system of FIG. 1.

With reference to FIG. 15, and in response to the end-user's entering the necessary customer, shipping and billing information on the customer information screen 355, the end-user is presented with a thank you screen 360, thanking the end-user for placing the order and indicating a reference number 361 which is associated with the new order file and thereafter with the end-user's registered account. The reference number 361 may be used by registered users to inquire as to the status of their respective orders.

Figure 16:
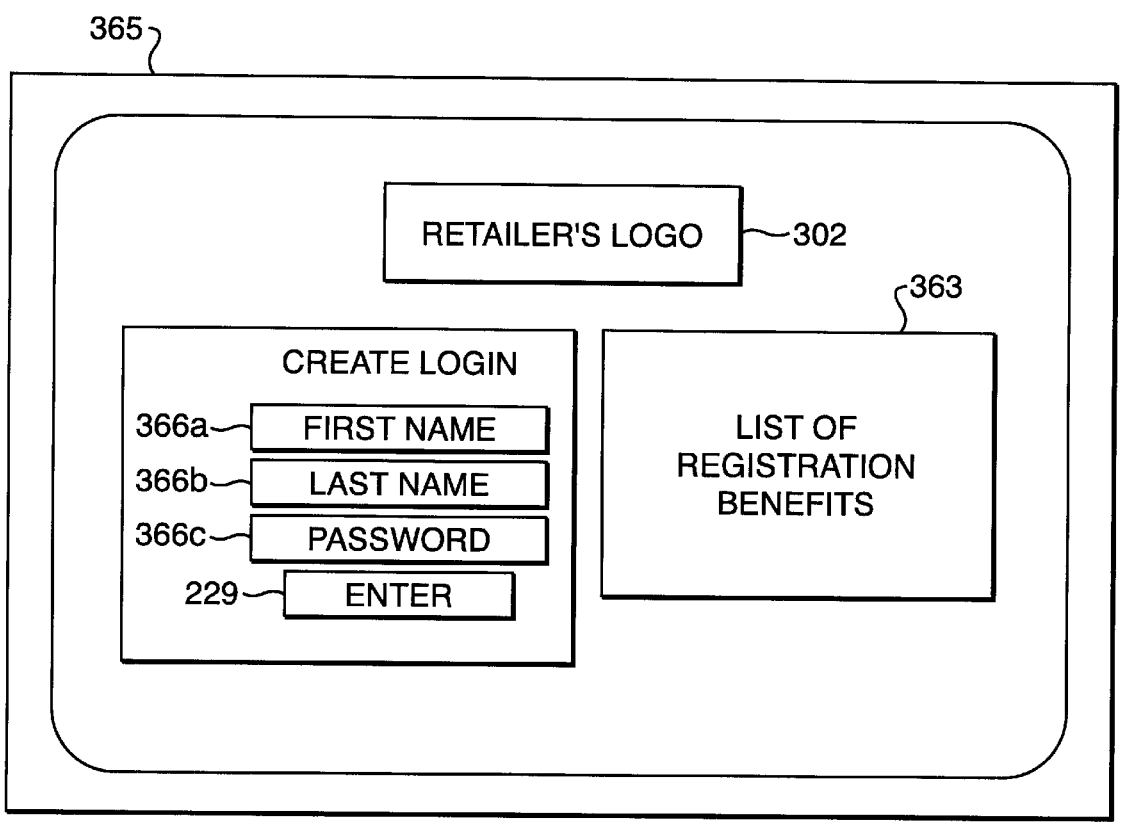
FIG. 16 is a schematic diagram of a new user registration screen of the system of FIG. 1.

With additional reference to FIG. 16, a new end-user may register for an end-user client account by selecting a hypertext button 362 on the thank you screen 360, which then displays a new user registration screen 365 and prompts the end-user for registration information, such as first and last names and an account password. Data entry fields 366a, 366b, 366c may be provided on the new user registration screen 360 to enter such information. A list of registration benefits 363 may be provided.

With additional reference to FIG. 17, a registered user's "home" screen 370 is displayed after the end-user enters the requested information on the new user registration screen 365. The registered user's "home" screen 370 may also be displayed upon selecting a "Home Screen" hypertext button 363 on the thank you screen 360. Once the end-user registers as herein described, the registered user's "home" screen 370 is the primary interface between the preparation system 201 and the end-user for future orders. Particularly, the registered user's "home" screen 370 is displayed immediately after the login screen 305 (FIG. 5), upon the end-user's successfully entering the requested login information, such as customer name and password in the appropriate fields 306, 307, 308, respectively (FIG. 5), thereby bypassing the first and second locator screens 310 (FIG. 6), 315 (FIG. 7), respectively, as the information contained on these screens was previously selected and saved in the registered end-user's client profile. Registered users also bypass the choose product screen 320 (FIG. 8), as hypertext buttons 371a, 371b, 371c, 371d, 371e are provided on the registered end-user's "home" screen 370 which permit the end-user to select a product to order and prepare thereby.

In many locations throughout the preparation system 201, customer information may be provided by default, thereby filling in certain frequently-used information for the end-user. For example, and with reference back to the customer information screen 355 (FIG. 14), the registered end-user's customer, shipping and billing information may be inserted by default in their respective fields. The end-user may override such defaults by typing over the default text inserted therein; however, without making any changes thereto, the data will remain the same, thereby eliminating the need for the end-user to enter such information more than once.

From the registered end-user's "home" screen 370, the registered end-user may also obtain help information (by selecting a first hypertext button 372), reorder previously-prepared customized printed products (by selecting a second hypertext button 373), inquire as to the status of a pending order (by selecting a third hypertext button 374), upload additional original artwork (by selecting a fourth hypertext button 375) or request additional services (by selecting a fifth hypertext button 376). Each button executes an associated stored procedure from the stored procedures library 240.

Figure 18:
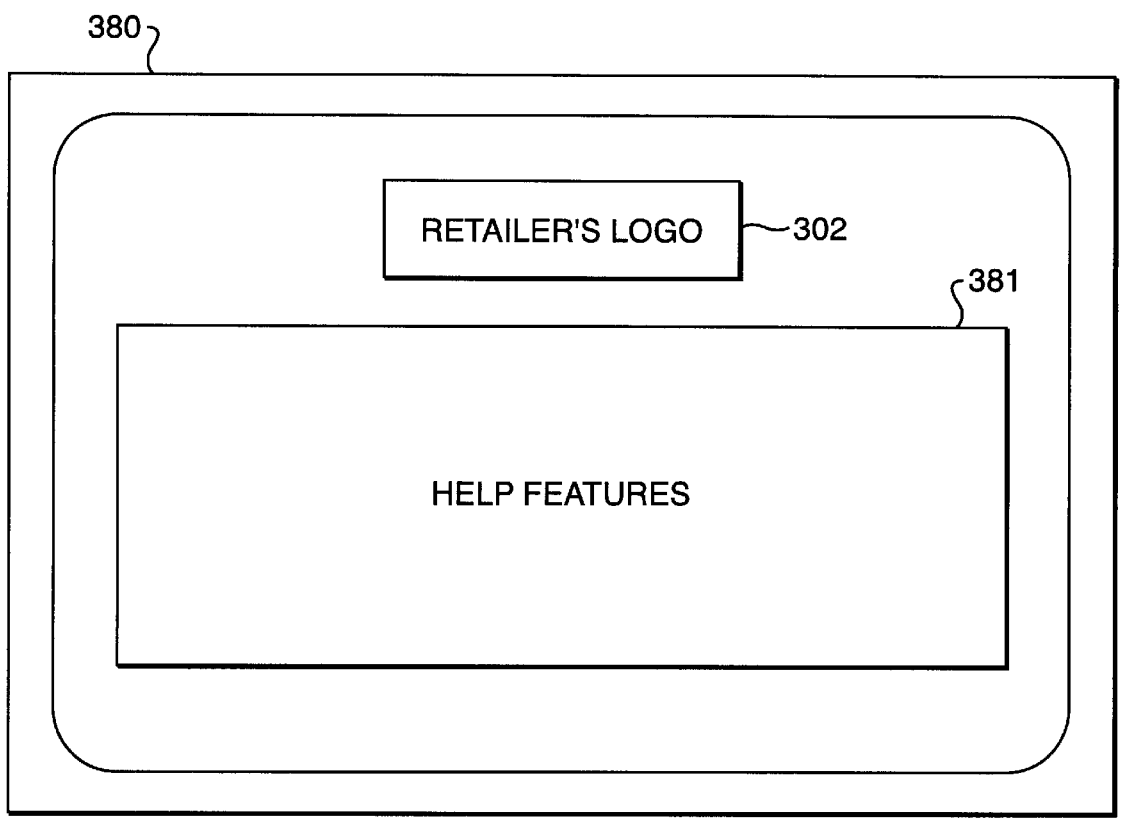
FIG. 18 is a schematic diagram of a help stored procedure screen of the system of FIG. 1.

With reference to FIG. 18, and upon the end-user's selecting the help button 373 on the registered end-user's "home" screen 370, a help screen 380 is displayed containing an index 381 of help topics. Initiation of the help screen 380 is a stored procedure located in the stored procedures library 240 and is accessible from many different locations within the various screens of the preparation system 201 simply by providing a hypertext link thereon. By selecting various help topics, the end user may obtain specific instruction relating to the many features and functions of the preparation system 201 herein described. The help screen 380 may also detect the screen from which help is being requested by the user, for example, from the registered user's "home" screen 370, thereby providing a list 381 of focused help topics specific to that particular screen.

Figure 19:
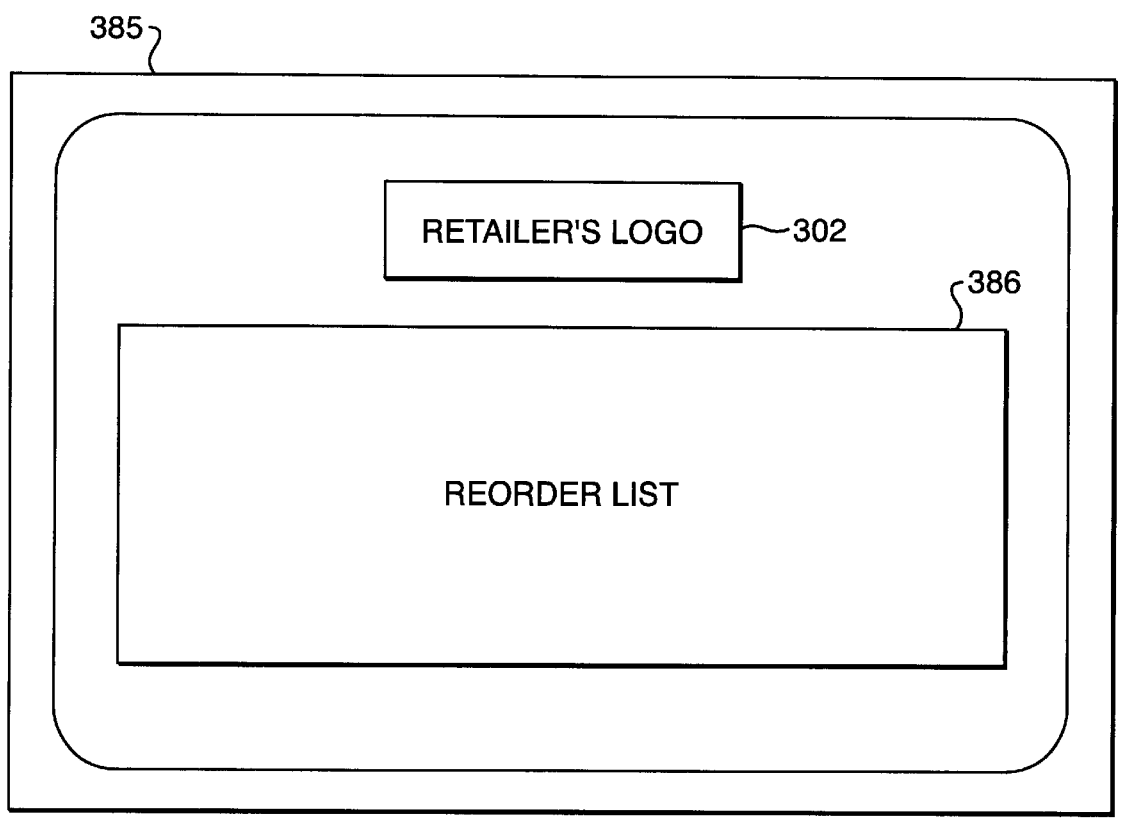
FIG. 19 is a schematic diagram of a reorder stored procedure screen of the system of FIG. 1.

With reference to FIG. 19, and in response to the end-user's selecting the reorder button 373 on the registered end-user's "home" screen 370, a reorder screen 385 is displayed, having a list 386 identifying orders previously submitted by the end-user through the retailer associated with the end-user's current registration. Initiation of the reorder screen 385 is a stored procedure located in the stored procedures library 240 and may be accessible from many different locations within the various screens of the preparation system 201 simply by providing a hypertext link thereon. The end-user may select an individual previous order from the list 386 to re-order same, either with or without further customization, as herein described.

Figure 20:
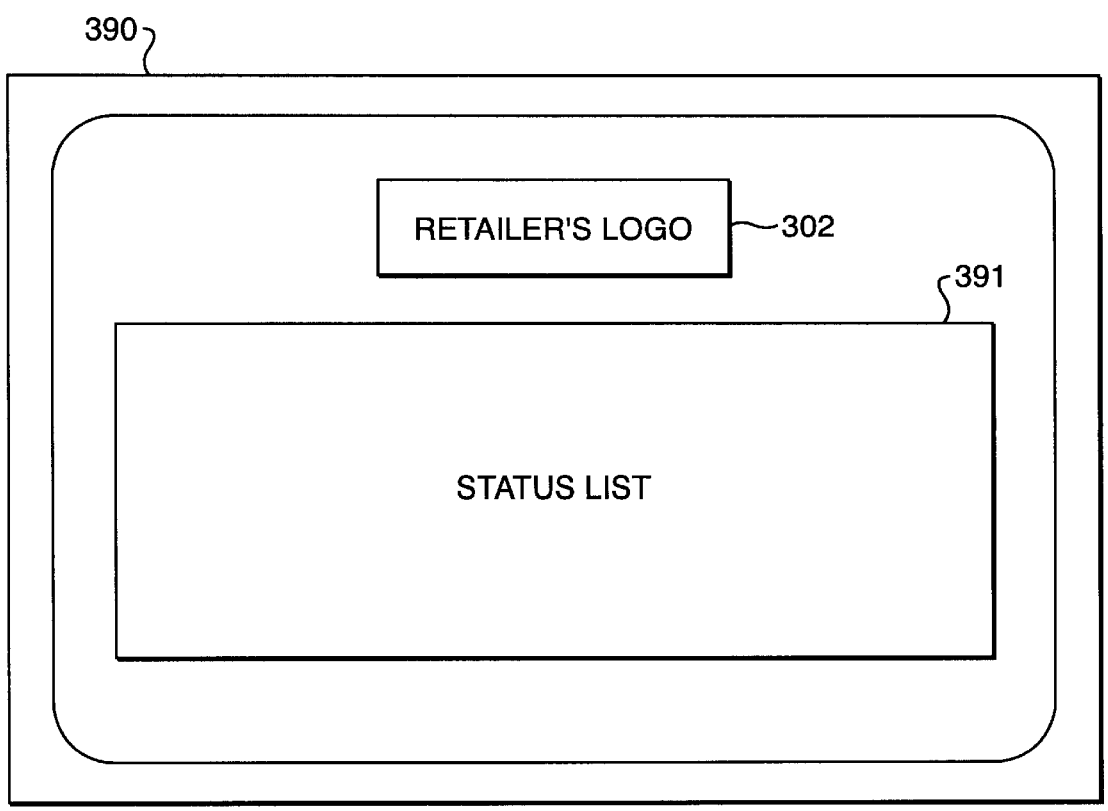
FIG. 20 is a schematic diagram of a check order status stored procedure screen of the system of FIG. 1.
Figure 21:
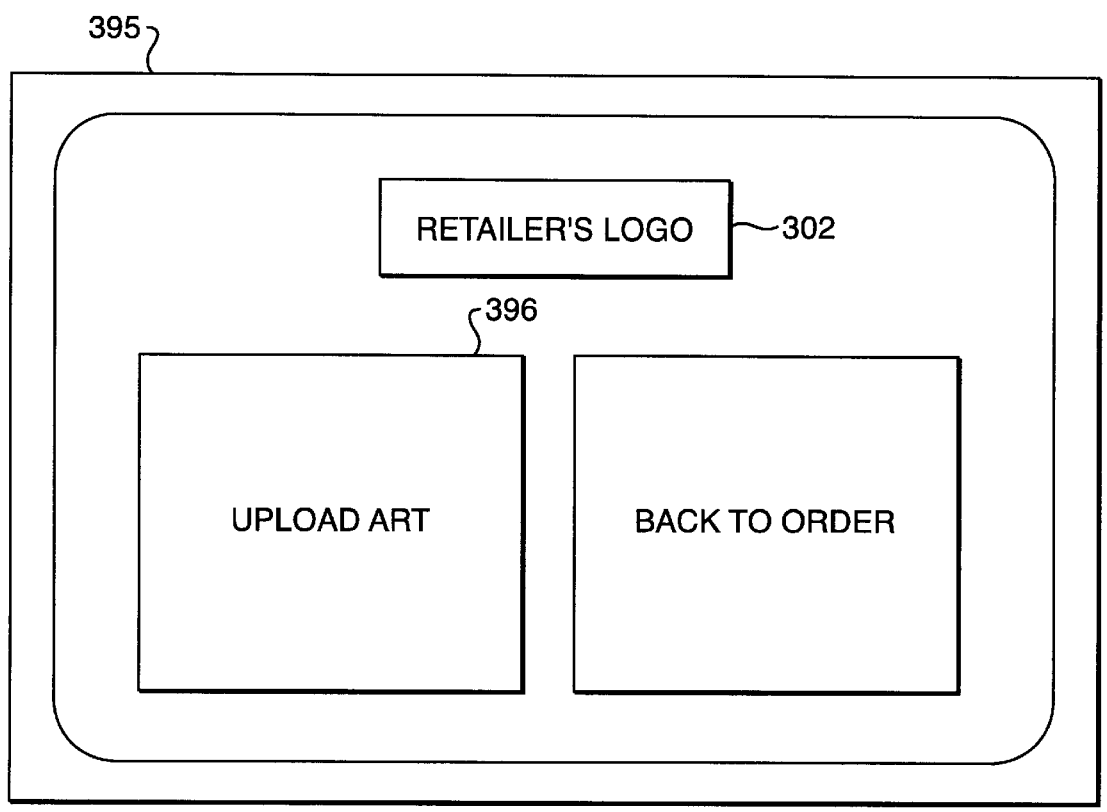
FIG. 21 is a schematic diagram of an upload art stored procedure screen of the system of FIG. 1.

With reference to FIG. 20, and in response to the end-user's selecting the check order status button 374 on the registered end-user's "home" screen 370, a check order status screen 390 is displayed having a list 391 identifying orders previously submitted by the end-user through the retailer associated with the end-user's registration which have not yet been printed or otherwise acted upon. Initiation of the check order status screen 390 is a stored procedure located in the stored procedures library 240 and may be accessible from many different locations within the various screens of the preparation system 201 simply by providing a hypertext link thereon.

With reference to FIG. 21, and in response to the end-user's selecting the upload art button 375 on the registered user's "home" screen 370, an upload art screen 395 is displayed in a manner similar to the manner by which an end-user uploads original artwork onto the preparation system 201 from the order information screen 325 (FIG. 9). Initiation of the upload art screen 395 is a stored procedure from the stored procedures library 240 and is accessible from many different locations within the various screens of the preparation system 201 simply by providing a hypertext link thereon.

Having submitted the new order, and possibly having registered, the end-user disconnects from the preparation system 201 by breaking the second Internet connection 52 between the end-user client computer 101 and the wholesaler web server computer 140. Because the new order was submitted from the customer information screen 355 (FIG. 14), disconnecting the client computer 101 from the wholesaler web server computer 140 does not affect the information contained in the new order file, which remains on the wholesaler web server computer 140 for additional processing as herein described.

Immediately upon the end-user submitting the new order, the new order is docketed in an order queue located in the retailer's dealer account. The new order file contains all pertinent order information obtained from the orders database 222 (FIG. 2), such as order reference number, end-user name, date on which end-user submitted the order, and the like, which is necessary for the retailer to process the order and for the wholesaler to prepare and print the customized product.

With combined reference to FIGS. 1 and 22, an e-mail message 145e is automatically transmitted from the wholesaler web server computer 140 to the retailer web server computer 120, notifying the retailer that a new order has been docketed on the retailer's new order queue. A copy of the new order is not transmitted to the retailer; rather, the notification simply instructs the retailer to connect to the wholesaler's web server computer 140, via the wholesaler's Internet web site, and to access the retailer's dealer account files thereon for information relating to the new order.

Figure 23:
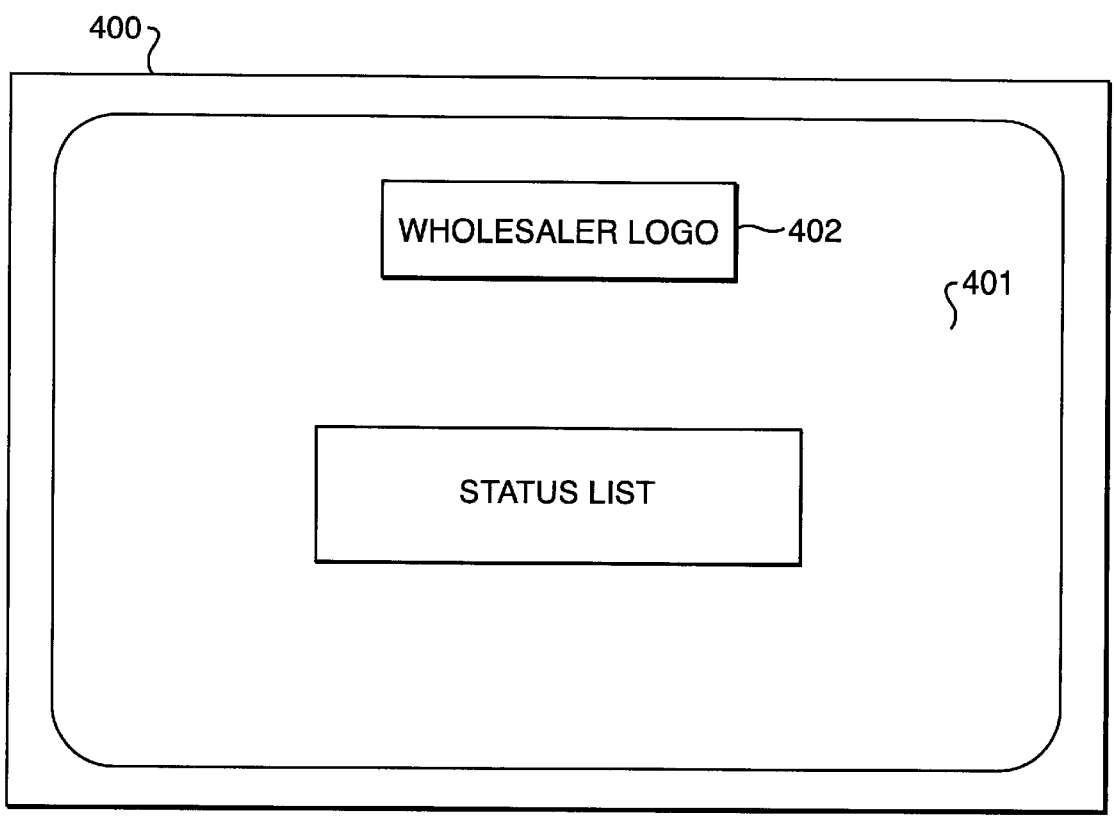
FIG. 23 is a schematic diagram of a wholesaler web site "home page" of the system of FIG. 1.

With reference to FIG. 23, the wholesaler has previously established on the wholesaler web server computer 140 a web site "home page" 400 addressable on the Internet 50, preferably on the World Wide Web thereof, and accessible by the retailer thereover using conventional network communications, Internet addressing and data transfer means. Although the end-user connects to the wholesaler web server computer 140, and to the preparation system 201 herein described, while using the system and method herein described, the end-user's connection to the wholesaler web server computer 140 is anonymous to the end-user and preferably bypasses the wholesaler's web site "home page" 400. As such, the end-user does not typically view the wholesaler web site "home page" 400, which instead serves as a means for the retailer to communicate with the wholesaler in completing the end-user's order. The wholesaler's web site "home page" 400 may include indicia 402 unique to the wholesaler, such as a company logo or the like, and includes a hypertext button 401 located anywhere on the wholesaler web site by which the retailer may access the retailer's dealer account thereby.

Figure 24:
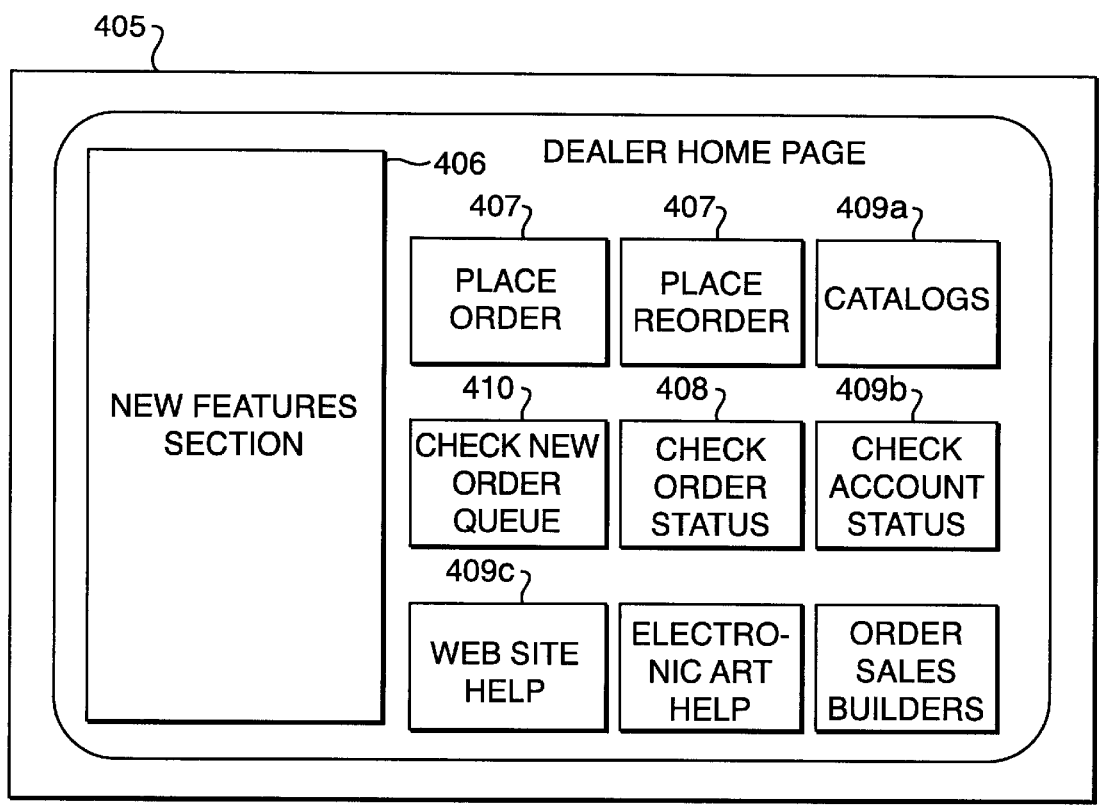
FIG. 24 is a schematic diagram of a dealer "home" screen located on the wholesaler web site of FIG. 23.

With reference to FIG. 24, and in response to the retailer's selecting the "Dealer Login" hypertext button 401 on the wholesaler's web site, the retailer is presented with a dealer "home" screen 405 having one or more hypertext action buttons displayed thereon and having a new features section 406 by which the wholesaler may generally communicate to the retailer regarding the addition of new features to the wholesaler's web site or to the preparation system 201.

One or more "Place Order" hypertext buttons 407 may be provided on the dealer "home" screen 405, selection of which transfers the retailer to a portion of the wholesaler's web site through which the retailer may order wholesale printed products, either with or without customization, for retail sale in the retailer's store.

A "Check Order Status" hypertext button 408 may also be provided, selection of which transfers the retailer to a portion of the wholesaler's web site through which the retailer may inquire as to the status of any orders placed using the hypertext buttons 407.

Additional support hypertext buttons may be provided on the dealer's "home" screen 405. For example, a "Catalogs" hypertext button 409a, the selection of which permits the retailer to browse the contents of all products available for wholesale by the wholesaler; a "Check Account Status" hypertext button 409b may be provided, the selection of which permits the retailer to inquire as to the status of the retailer's dealer account; and, various "Help" hypertext buttons 409c may be provided, the selection of which accesses certain help and system support information and stored procedures.

Figure 25:
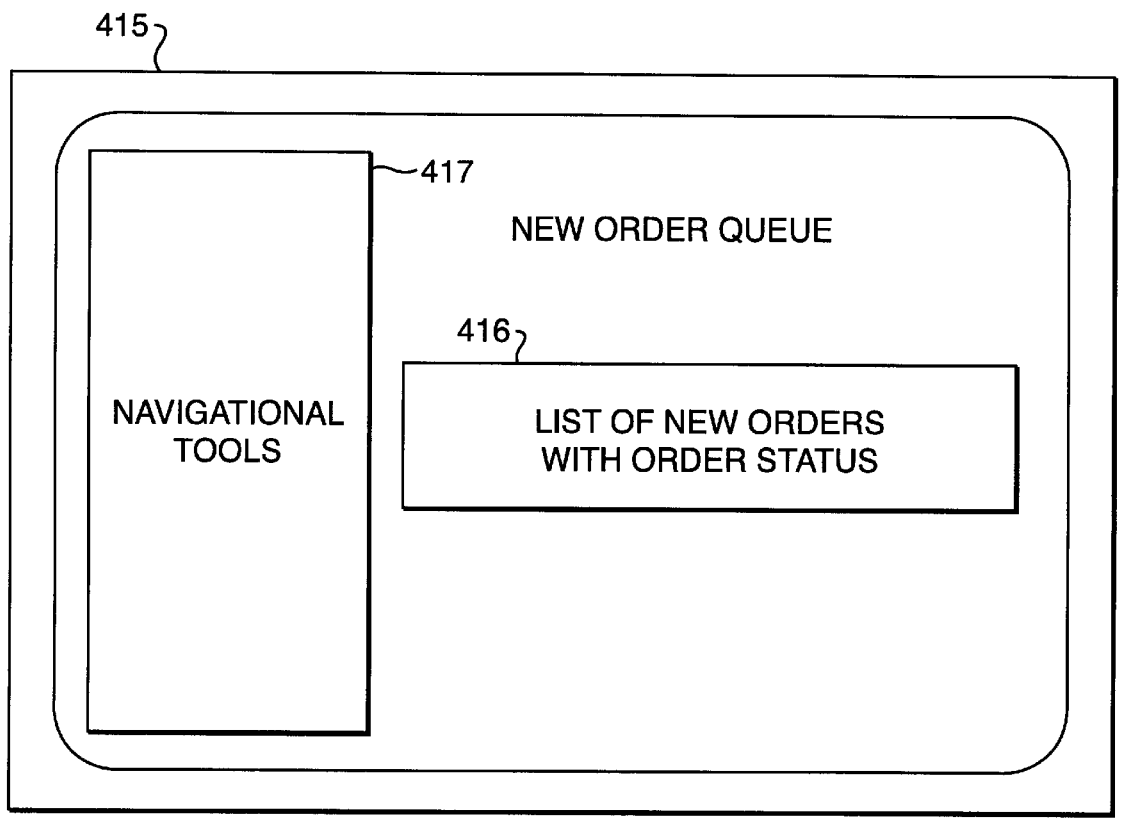
FIG. 25 is a schematic diagram of a new order queue screen located on the wholesaler web site of FIG. 23.

With additional reference to FIG. 25, a "Check New Order Queue" hypertext button 410 is provided on the dealer's "home" screen 405, selection of which transfers the retailer to a new order queue screen 415 having a list 416 thereon containing new order information relating to all pending end-user orders submitted through the retailer's web site which have been docketed on the retailer's new order queue. A navigation toolbar 417 is provided on the new order queue screen 415 having certain action buttons thereon, such as, "View Order", "Help", or "Return to Dealer Home Screen".

Figure 26:
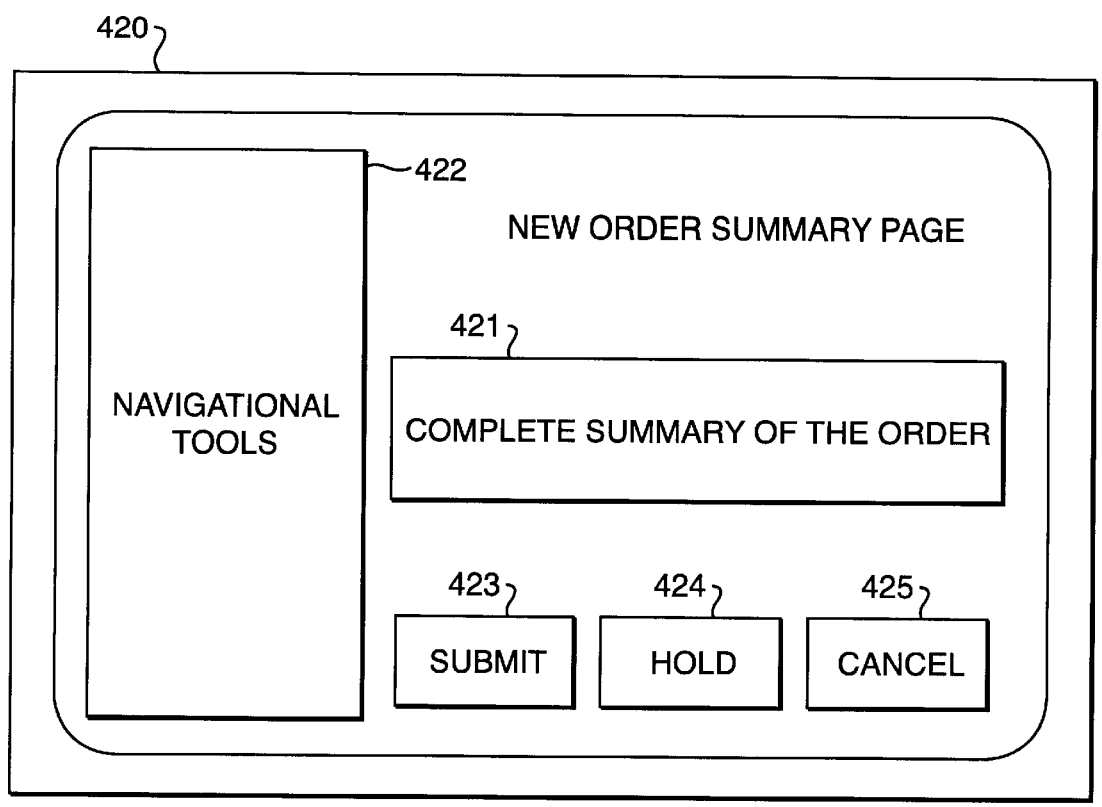
FIG. 26 is a schematic diagram of a new order summary screen located on the wholesaler web site of FIG. 23.

With additional reference to FIG. 26, and in response to the retailer's selecting a specific new order from the new order list 416 on the new order queue screen 415, an order summary screen 420 is displayed, showing detailed information relating to the new order immediately selected. The order summary screen 420 includes a complete order summary region 421, a navigation toolbar 422, a "Submit" hypertext button 423, a "Hold" hypertext button 424, and a "Cancel" hypertext button 425 thereon. The order summary region 421 may contain an image of the customized printed product submitted for order by the end-user, as well as all order information, including quantity, stock, color, billing and shipping information, relating to the order. The retailer reviews the order information and either submits the order into production (by selecting the "Submit" hypertext button 423), suspends the order pending further action (by selecting the "Hold" hypertext button 424) or cancels the order completely (by selecting the "Cancel" hypertext button 425).

For example, after reviewing the order information, the retailer will process the billing instructions provided by the end-user. If such billing instructions includes billing a credit card for payment of the products, the retailer will process the necessary credit card information to receive payment for the products, after which the retailer will submit the order into production by selecting the "Submit" hypertext button 423. If, however, the retailer is unable to receive payment for the products, he/she may suspend the order, pending the end-user's payment for the order using alternative payment means, or may cancel the order altogether. If the retailer suspends the new order, the new order will remain docketed on the new order queue for a predetermined period of time, for example, 90 days, during which the retailer must act on the new order before it is automatically deleted from the system. If the retailer cancels the new order, or if the retailer fails to take action on the new order within a predetermined period of time, the new order is deleted from the system and from all databases therein.

With reference back to FIG. 3, the new order file, containing an electronic image of the customized printed product created by the end user, remains in the orders database 222 until the retailer designates that the new order should be submitted into production. Although a copy of the image is posted to the retailer's new order queue, a copy of the formatted new order file, containing an image and all the information necessary to print the product represented thereby, is never transmitted to the retailer's web server computer 120, nor is it ever posted to the retailer's new order queue. Thus, a retailer, having access only to the data and information herein provided, could not produce the printed products.

Once the retailer designates that the new order should be submitted into production, the new order file is automatically transferred to the workflow management server computer 280, where the image of the customized printed product is automatically formatted with reference to the information database 287 to prepare the file for printing. The formatted file is then verified using the quality assurance workstations 290 to make sure that no data was lost or otherwise distorted during the preparation, authorization and formatting of the order and of the customized printed product associated therewith.

After being verified, the formatted file is automatically submitted into production, wherein conventional mold-forming and plate-forming equipment 500 cooperate to manufacture a printing plate having the customized image thereon for use in conventional printing equipment to produce the desired quantity of customized printed products, which may then be shipped by the wholesaler in accordance with the end-user's instructions.

Alternatively, instead of transmitting the new order file to the workflow management server computer 280, the preparation system 201 may transmit the new order file to a third-party manufacturer, other than the retailer, for processing. For example, where the end-user submits a request for a specialty product not manufactured by the wholesaler.

A system and method for preparing a customized printed product over a communications network, such as the Internet, according to an alternative embodiment of the present invention includes many steps and components in common with the preferred embodiment hereof. However, according to the method of the present alternative embodiment, the wholesaler process the billing information instead of the retailer. The retailer views the new order queue, then, and submits the order into production, without processing the billing information.

Alternatively still, wherein the wholesaler processes the billing information instead of the retailer, the retailer need not connect to the retailer's dealer account to submit the order into production. Rather, the order is submitted into production automatically upon the wholesaler's successfully processing the billing information.

Even further, a copy of the new order file, containing the image of the customized printed product, may be attached to the e-mail from the wholesaler to the retailer following submission of the new order by the end-user, in which case, the retailer, and not the wholesaler, may produce the desired quantity of customized printed products and ship same to the end-user according to the end-user's instructions.

Figure 27:
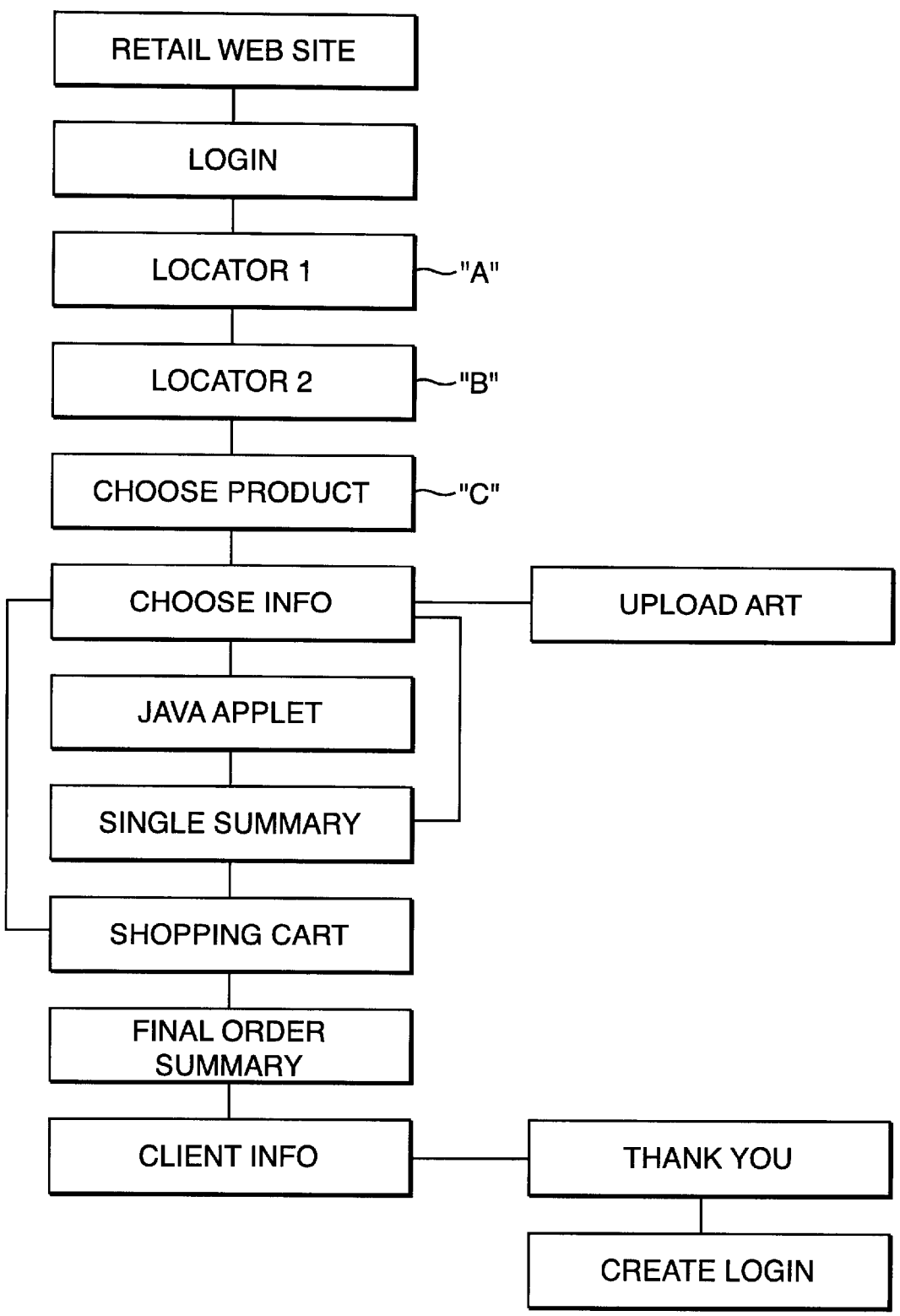
FIG. 27 is a flow chart of a method of preparing a customized printed product over a communications network according to a preferred embodiment of the present invention, showing the steps therein with respect to a new end-user connecting to the system of FIG. 1 through a franchised retail web site.

With respect to FIG. 27, the method described herein is shown with respect to a new end-user connecting the preparation system 201 via the web site of a franchised retail store and includes the step of identifying the state and country of a desired franchise store with which the end-user wishes to transact business (this step being denoted generally as reference letter "A") and the step of identifying the particular franchise store within the state and country so identified (this step being denoted generally by reference letter "B"). Because the end-user has not yet established a registered end-user account, the end-user must choose a product to prepare according to the within method in a separate step (this step being denoted generally by reference letter "C").

Figure 28:
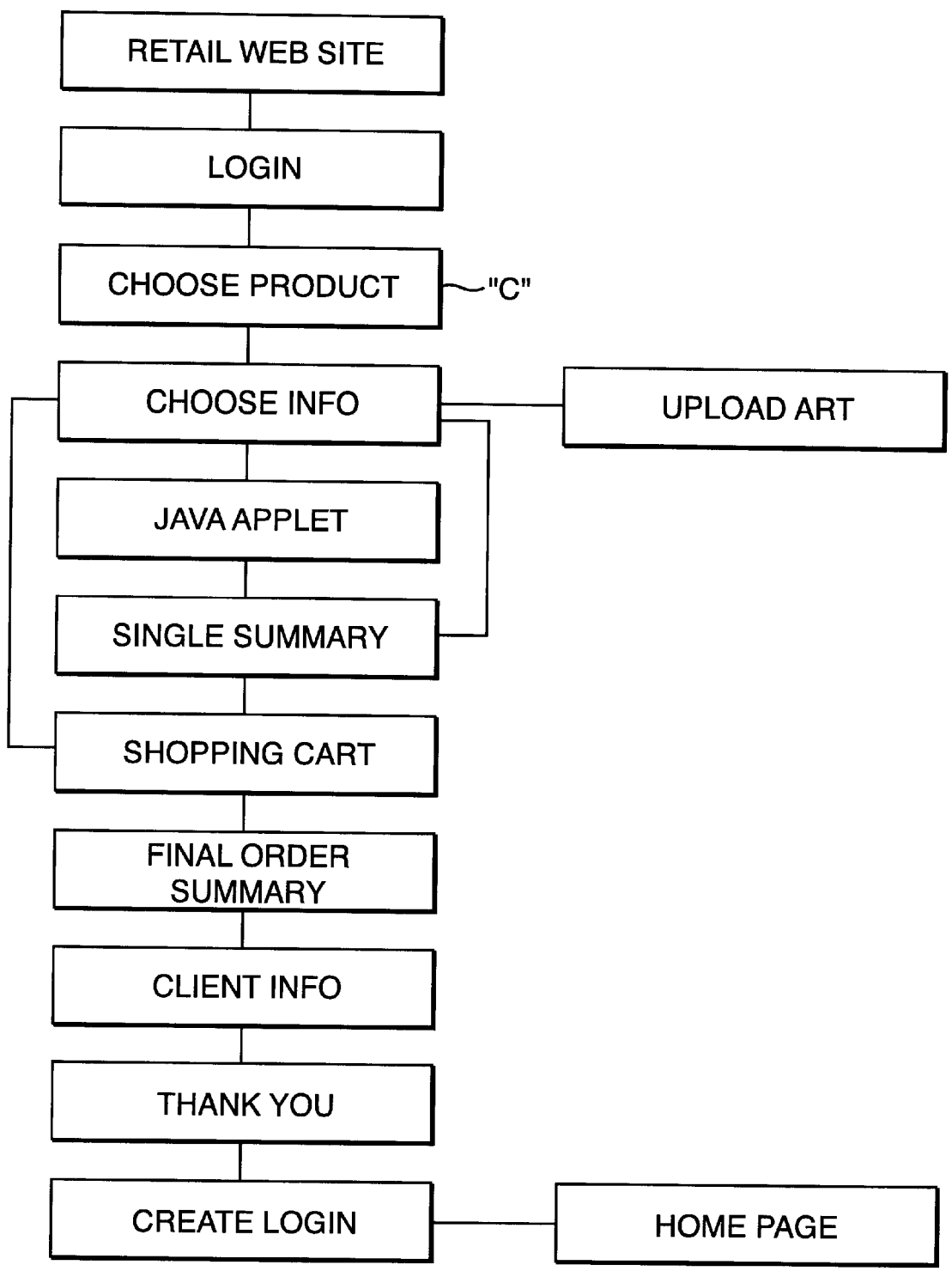
FIG. 28 is a flow chart of the method of FIG. 27, showing the steps therein with respect to a new end-user connecting to the system of FIG. 1 through an individual retail web site; and, FIG. 29 is a flow chart of the method of FIG. 27, showing the steps therein with respect to an existing end-user connecting to the system of FIG. 1 through a franchised retail web site.

With respect to FIG. 28, the method described herein is shown with respect to a new end-user connecting to the preparation system 201 via the web site of an individual retail store. Because there is only one store with which the end-user may transact business, the steps "A" and "B" shown in FIG. 27 are not necessary. However, because the end-user has not yet established a registered end-user account, the end-user must choose a product to prepare according to the within method in a separate step (this step being denoted generally by reference letter "C").

Figure 29:
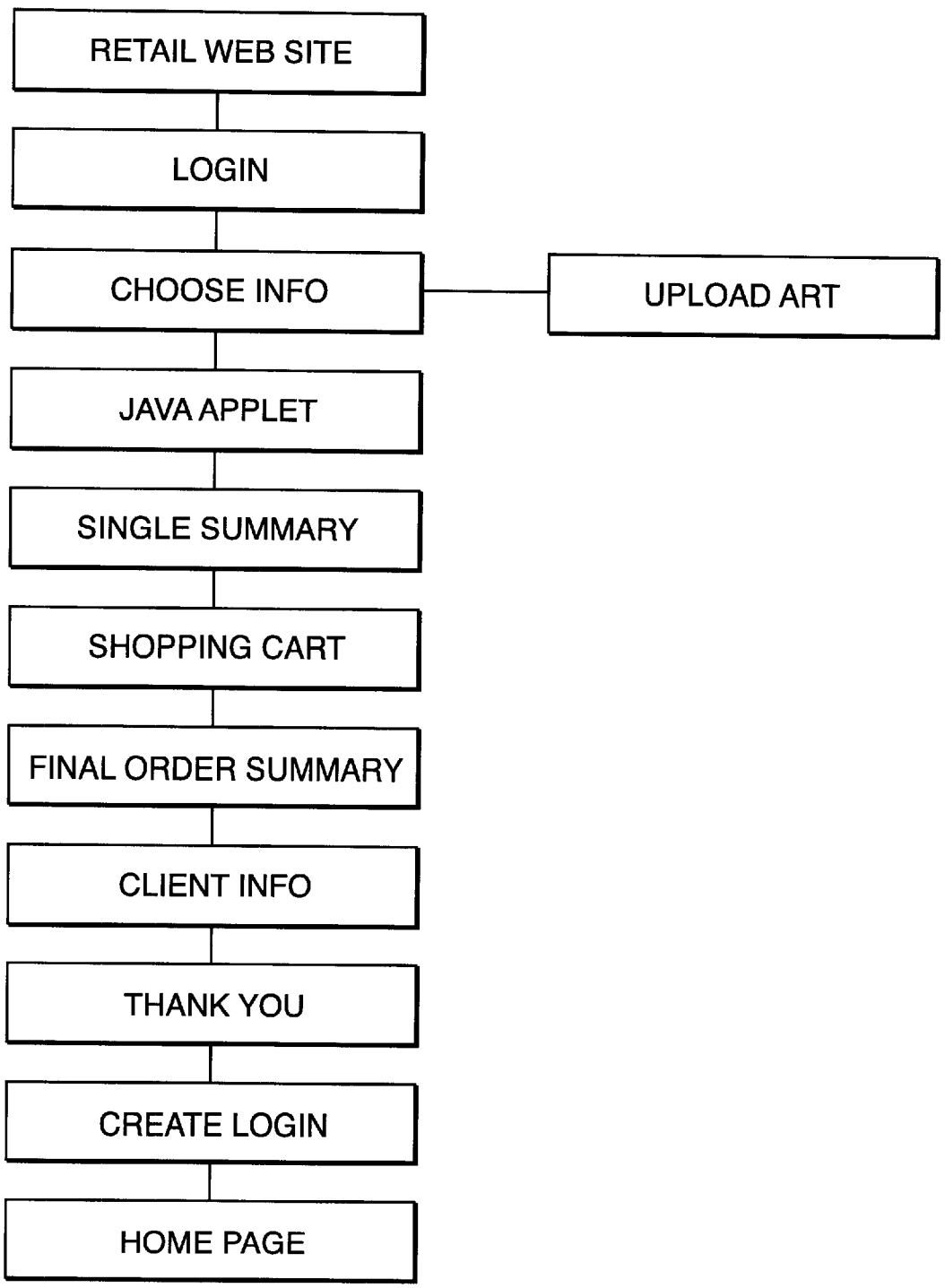

With respect to FIG. 29, the method described herein is shown with respect to an existing end-user connecting to the preparation system 201 via the web site of a franchised retail store. Because the end-user has previously registered, steps "A", "B" and "C" are unnecessary.

Although the present invention has been described in terms of specific embodiments which are set forth in detail, it should be understood that this is by illustration only and that the present invention is not necessarily limited thereto, since alternative embodiments not described in detail herein will become apparent to those skilled in the art in view of the disclosure. Accordingly, modifications are contemplated which can be made without departing from either the spirit or the scope of the present invention as described hereinabove.

We claim:

1. A system for preparing customized printed products over a communications network, comprising:
   a wholesaler web server computer connected to said network, said wholesaler web server computer having a printed products preparation system provided thereby, said printed products preparation system being adapted to permit an end-user operating an end-user client computer connected to said wholesaler web server computer to prepare an electronic image of one of said customized printed products;
   at least one retailer web server computer connected to said network, said at least one retailer web server computer being adapted to transfer an end-user client computer connected thereto to said wholesaler web server computer over said network;
   a wholesaler workflow management server computer connected to said wholesaler web server computer, said wholesaler workflow management server computer having a workflow management system provided thereby, said workflow management system being adapted to receive a copy of said electronic image from said printed products preparation system and to print a predetermined quantity of said customized printed products therefrom;
   said wholesaler web server computer being adapted to transmit, responsive to said printed products preparation system, a notification message to said at least one retailer web server computer, said at least one retailer web server computer being adapted to receive said notification message, said at least one retailer web server computer being adapted to connect to said wholesaler web server computer to view said copy of said electronic image; and,
   said copy of said electronic image being transmitted from said printed products preparation system to said workflow management system upon designation of said notification message by said retailer web server computer.

2. The system of claim 1, wherein said wholesaler web server computer is anonymously connected to said end-user client computer.

3. The system of claim 1, wherein said printed products preparation system includes at least one database therein, said at least one database being in data communication with said end-user client computer.

4. The system of claim 3, wherein said at least one database includes a portion thereof associated with said end-user, said end-user portion of said at least one database being accessible only by said end-user.

5. The system of claim 4, wherein said end-user portion of said at least one database is adapted to receive a copy of said electronic image of said customized printed product and to store said copy of said electronic image therein, said copy of said electronic image being retrievable by said end-user.

6. The system of claim 4, wherein said end-user portion of said at least one database is adapted to receive from said end-user client computer an electronic design and to store said electronic design therein, said electronic design being retrievable by said end-user.

7. The system of claim 1, wherein said printed products preparation system includes portions thereof being in real-time communication with said end-user client computer.

8. The system of claim 1, wherein said at least one retailer web server computer transfers said end-user client computer to said wholesaler web server computer responsive to a selection by said end-user.

9. The system of claim 1, wherein said printed product is selected from the group consisting of pressure-sensitive labels, business cards, business stationary, personal stationary, greeting cards, and note pads.

10. The system of claim 1, wherein said network is the Internet.

11. The system of claim 10, wherein said end-user client computer connects to said retailer web server computer by a retailer web site addressable on the Internet.

12. A method for preparing customized printed products over a communications network, comprising the steps of:
   providing an end-user client computer, a retailer web server computer and a wholesaler web server computer, said retailer web server being connected to said network, said wholesaler web server computer being connected to said network;
   connecting said end-user client computer to said retailer web server computer;
   said retailer web server computer transferring said end-user client computer to said wholesaler web server computer upon an end-user of said end-user client computer selecting a predetermined link provided on said retailer web server computer;
   said end-user using a printed products preparation system provided on said wholesaler web server computer to prepare an electronic image of one of said customized printed products;
   said wholesaler web server computer transmitting a notification message to said retailer web server computer upon said end-user completing said preparation of said electronic image;
   said retailer making a designation of said new order file upon receiving said notification message, said designation being selected from the group including submit, hold or delete said electronic image; and,
   said wholesaler printing a predetermined quantity of printed products according to said electronic image upon receiving said designation of submit from said retailer.

13. The method of claim 12, wherein said step of connecting said end-user client computer to said wholesaler web server computer includes the further step of anonymously connecting said wholesaler web server computer to said end-user client computer.

14. The method of claim 12, wherein said network is the Internet.

15. The method of claim 12, wherein said notification message is transmitted by electronic mail.

16. The method of claim 12, wherein said step of said end-user using said preparation system is performed in realtime.

17. The method of claim 14, wherein said step of said connecting said end-user client computer to said retailer web server computer further includes the step of connecting said end-user client computer to a retailer web site addressable on the Internet.

18. The method of claim 12, further comprising the step of said end-user transmitting an electronic design from said end-user client computer to said wholesaler web server computer.

19. The method of claim 12, wherein said step of said retailer making said designation further includes the step of said retailer connecting said retailer web server computer to said wholesaler web server computer, said retailer having a dealer account located on said wholesaler web server computer.

20. The method of claim 19, said step of said retailer connecting said retailer web server computer to said wholesaler web server computer further includes the step of reviewing a new order queue provided in said dealer account.

* * * * *